United States Patent
Kelley et al.

[11] Patent Number: 5,912,831
[45] Date of Patent: *Jun. 15, 1999

[54] PROCESS AND SYSTEM FOR ADDING OR SUBSTRACTING SYMBOLS IN ANY BASE WITHOUT CONVERTING TO A COMMON BASE

[75] Inventors: Edward E. Kelley, Wappingers Falls; Norman J. Dauerer, Hopewell Junction; Franko Motika, Hopewell Junction; Aziz M. Ahsan, Hopewell Junction, all of N.Y.

[73] Assignee: International Business Machines Corporation, Armonk, N.Y.

[*] Notice: This patent is subject to a terminal disclaimer.

[21] Appl. No.: 08/897,170

[22] Filed: Jul. 18, 1997

Related U.S. Application Data

[63] Continuation of application No. 08/575,105, Dec. 19, 1995, Pat. No. 5,673,216.

[51] Int. Cl.$^6$ ..................................................... G06T 7/50
[52] U.S. Cl. .............................................................. 364/771
[58] Field of Search ................................... 364/771, 768; 341/83, 88, 89

[56] References Cited

U.S. PATENT DOCUMENTS

| | | |
|---|---|---|
| 3,222,506 | 12/1965 | Meade . |
| 3,748,450 | 7/1973 | Fico et al. . |
| 4,441,159 | 4/1984 | Hart . |
| 4,456,955 | 6/1984 | Yanagita et al. . |
| 4,528,641 | 7/1985 | Burrows . |
| 4,719,590 | 1/1988 | Aman . |
| 5,146,423 | 9/1992 | Fischer et al. . |
| 5,369,607 | 11/1994 | Okamoto . |

*Primary Examiner*—Tan V. Mai
*Attorney, Agent, or Firm*—DeLio & Peterson, LLC; Peter W. Peterson; Aziz M. Ahsan

[57] ABSTRACT

A process and system for effecting addition and/or subtraction any two symbols having any number of characters and in any base with full precision and without first converting to a common base. Regardless of the quantity of characters of each symbol, the speed of execution remains almost constant per character. The process and system of the present invention does not require the use of floating point notation. Furthermore, the process and system of the present invention does not require or use standard mathematical algorithms, addition or subtraction tables, or exponentiation.

29 Claims, 12 Drawing Sheets

PROCESS AND SYSTEM FOR ADDING OR SUBSTRACTING SYMBOLS IN ANY BASE WITHOUT CONVERTING TO A COMMON BASE

This application is a continuation of application Ser. No. 08/575,105 filed Dec. 19, 1995, now U.S. Pat. No. 5,673,216.

BACKGROUND OF THE INVENTION

1. Field of the Invention

The present invention relates to a process and system for adding or subtracting any size symbols in any base with full precision and without first converting to a common base.

2. Problems to be Solved

Numerous problems are encountered when adding or subtracting numbers of any base. The numbers must first be converted to a common base, such as base 2 or 10, in order to do the calculation. This conversion process is time consuming. Furthermore, as the numbers get larger, the precision of the computational results decrease. For example, conventional processes typically involve converting the computational result to floating point when the result has more than a predetermined number of digits. However, converting the result to floating point results in a loss of precision.

Therefore, it is a purpose of the present invention to provide a new and improved process and system for adding or subtracting any two numbers of any base without first converting the base to a common base.

It is another purpose of the present invention to provide a new and improved process and system for adding or subtracting numbers of any base without first converting the base to a common base and wherein the process effects a precise computational result for substantially any size digit.

A further purpose of the invention is to provide a new and improved process and system for adding or subtracting numbers of any base without requiring a preliminary conversion to a common base and without converting the result of such addition and subtraction to floating point.

It is yet another purpose of the present invention to provide a new and improved process and system for adding or subtracting numbers of any base without first converting the base to a common base and which does not use exponentiation.

Another purpose of this invention is to encode or process a set of data and after processing the encoded data to be able to decode the resulting data.

Yet another purpose of this invention is to encode or process the data in any language, such as, for example, computer languages, spoken languages, written languages, to name a few.

Still other purposes and advantages of the invention will in part be obvious and will in part be apparent from the specification.

SUMMARY OF THE INVENTION

The above and other purposes and advantages, which will be apparent to those skilled in the art, are achieved in the present invention which is directed to, in a first aspect, a process and system for effecting addition and/or subtraction of any two symbols associated with a specific symbol system and having any number of characters and in any base with full precision and without first converting to a common base. Regardless of the quantity of characters of each symbol, the speed of execution remains almost constant per character. The process of the present invention does not require a conversion to the base of the indicated character nor does it require a conversion to a common base. The process of the present invention also does not require the use of floating point notation. Furthermore, the process of the present invention does not require or use standard mathematical algorithms, addition or subtraction tables, or exponentiation.

The process and system of the present invention implement addition or subtraction of characters using a predetermined floating base. A floating base as used herein means using any base without first converting to a common base. In a preferred embodiment, the process uses a floating base between 2 and 36, inclusive. However, the process of the present invention may be modified to use a floating base greater than 36. The process may also be modified to use a base having a decimal point. In a preferred embodiment, the system of the present invention used to implement the aforementioned process uses a floating base between 2 and 127, inclusive.

The characters being added or subtracted can be numbers, alphabets, signs, symbols and can also include any language symbols. This could be any computer language or any spoken or written language. Each symbol is associated with a specific symbol system. For example, if it is desired to add two (2) numbers in the base 10 number system, then each number is a symbol, each digit of each number is a character, and the base 10 number system is the symbol system. The process automatically chooses a character string and operates on the request. Furthermore, the character string can be of any length and of any character. The process and system of the present invention can be used to send and receive electronic mail by assigning unique identifiers, assigning part numbers where each block of parts has a different base, for encrypting documents, designing electronic or computer circuits.

In a related aspect, the present invention is directed to a program storage device readable by a machine, tangibly embodying a program of instructions executable by the machine to perform the method steps for adding or subtracting symbols in any base, the method steps comprising: a) obtaining data defining at least two numbers in a number system having a base and a desired base, each number having at least one digit; b) adding the digits of the numbers to produce a first interim sum; c) determining if the first interim sum is greater than or equal to the desired base; d) subtracting in the desired base from the first interim sum to produce a difference if in step (c), it is determined that the first interim sum is greater than or equal to the desired base; e) determining the difference if in step (c), it is determined that the first interim sum is greater than or equal to the desired base, or the first interim sum if in step (c), it is determined that the first interim sum is less than the desired base; and f) producing a carry variable for a next digit addition operation if in step (c), it is determined that the first interim sum is greater than or equal to the desired base.

In a related aspect, the present invention is directed to a program storage device readable by a machine, tangibly embodying a program of instructions executable by the machine to perform the method steps for adding or subtracting symbols in any base, the method steps comprising: a) obtaining data defining numbers in a number system having a base, each number having at least one digit and a value, the data further defining a desired base; b) adding the desired base to a digit of one of the numbers to produce a first interim sum; c) subtracting a digit of the other number from the first interim sum to produce an interim difference; d) determining if the interim difference is greater than or equal to the desired base; e) subtracting the desired base from the interim difference to produce a final difference if in step (c), it is determined that the interim difference is greater than or equal to the desired base; f) determining the final difference if in step (c), it is determined that the interim difference is greater than or equal to the desired base, or the interim difference if in step (c), it is determined that the interim difference is less than the desired base; and g) producing a borrow variable for input for a next digit subtraction operation if in step (c), it is determined that the interim difference is greater than or equal to the desired base.

In another aspect, the present invention is directed to a program storage device readable by a machine, tangibly embodying a program of instructions executable by the machine to perform the method steps for adding or subtracting symbols in any base the method steps comprising: a) obtaining data defining at least two numbers in a number system having a base, each number having at least one digit and a value, the data further defining operation information and a desired base, the operation information determining if an addition or subtraction operation is to be performed; b) adding the desired base to a digit of one of the numbers to form a first interim sum if the operation is subtraction; c) adding corresponding digits of the numbers to form a second interim sum if the operation is addition; d) subtracting a digit of the other numbers from the first interim sum to form a first difference if the operation is subtraction; e) determining if the second interim sum is greater than or equal to the desired base if the operation is addition; f) subtracting the desired base from the second interim sum to form a second difference if the operation is addition and if in step (e), it is determined that the second interim sum is greater than the desired base; g) determining if the first difference is greater than or equal to the desired base if the operation is subtraction; h) subtracting the desired base from the interim difference if the operation is subtraction and in step (g), it is determined that the interim difference is greater than or equal to the desired base; and (i) generating a carry/borrow variable for use in steps (c) and (d) for succeeding digit addition or subtraction operations, respectively, the carry/borrow variable having a first state when the operation is addition and step (e) determines that the second interim sum is greater than or equal to the desired base, or if the operation is subtraction and step (g) determines that the interim difference is less than the desired base, the carry/borrow variable having a second state if the operation is addition and step (e) determines that the second interim sum is less than the desired base, or if the operation is subtraction and step (g) determines that the interim difference is greater than or equal to the desired base.

In a related aspect, the present invention is directed to a program storage device readable by a machine, tangibly embodying a program of instructions executable by the machine to perform the method steps for adding or subtracting symbols in any base, the method steps comprising: a) obtaining data defining at least two symbols in a symbol system having a base and a desired base, each symbol having at least one character; b) adding the characters of the symbols to produce a first interim sum; c) determining if the first interim sum is greater than or equal to the desired base; d) subtracting in the desired base from the first interim to produce a difference if in step (c), it is determined that the first interim sum is greater than or equal to the desired base; e) outputting to the storage medium the difference if in step (c), it is determined that the first interim sum is greater than or equal to the desired base, or the first interim sum if in step (c), it is determined that the first interim sum is less than the desired base; and f) producing a carry variable for input for a next character addition operation if in step (c), it is determined that the first interim sum is greater than or equal to the desired base.

In a related aspect, the present invention is directed to a program storage device readable by a machine, tangibly embodying a program of instructions executable by the machine to perform the method steps for adding or subtracting symbols in any base, the method steps comprising: a) obtaining data defining symbols in a symbol system having a base, each symbol having at least one character, the data further defining a desired base; b) adding the desired base to a character of one of the symbols to produce a first interim sum; c) subtracting a character of the other symbol from the first interim sum to produce an interim difference; d) determining if the interim difference is greater than or equal to the desired base; e) subtracting the desired base from the interim difference to produce a final difference if in step (c), it is determined that the interim difference is greater than or equal to the desired base; f) determining the final difference if in step (c), it is determined that the interim difference is greater than or equal to the desired base, or the interim difference if in step (c), it is determined that the interim difference is less than the desired base; and g) producing a borrow variable for a next character subtraction operation if in step (c), it is determined that the interim difference is greater than or equal to the desired base.

In a related aspect, the present invention is directed to a program storage device readable by a machine, tangibly embodying a program of instructions executable by the machine to perform the method steps for adding or subtracting symbols in any base, the method steps comprising: a) obtaining data defining at least two symbols in a symbol system having a base, each symbol having at least one character, the data further defining operation information and a desired base, the operation information determining if an addition or subtraction operation is to be performed; b) adding the desired base to a character of one of the symbols to form a first interim sum if the operation is subtraction; c) adding corresponding characters of the symbols to form a second interim sum if the operation is addition; d) subtracting a character of the other symbol from the first interim sum to form a first difference if the operation is subtraction; e) determining if the second interim sum is greater than or equal to the desired base if the operation is addition; f) subtracting the desired base from the second interim sum to form a second difference if the operation is addition and if in step (e), it is determined that the second interim sum is greater than the desired base; g) determining if the first difference is greater than or equal to the desired base if the operation is subtraction; h) subtracting, the desired base from the interim difference if the operation is subtraction and in step (g), it is determined that the interim difference is greater than or equal to the desired base; and (i) generating a carry/borrow variable for use in steps (c) and (d) for succeeding character addition or subtraction operations, respectively, the carry/borrow variable having a first state when the operation is addition and step (e) determines that the second interim sum is greater than or equal to the desired base, or if the operation is subtraction and step (g) determines that the interim difference is less than the desired base, the carry/borrow variable having a second state if the operation is addition and step (e) determines that the second interim sum is less than the desired base, or if the operation is subtraction and step (g) determines that the interim difference is greater than or equal to the desired base.

BRIEF DESCRIPTION OF THE DRAWINGS

The features of the invention are believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENTS

In describing the preferred embodiment of the present invention, reference will be made herein to FIGS. 1–11 of the drawings in which like numerals refer to like features of the invention.

Process

The ensuing description of the process of the present invention is in terms of implementing the process of the present invention to base numbers between 2 and 36, inclusive. However, the process of the present invention can be applied to base numbers not within the aforementioned range.

Figure 1A:
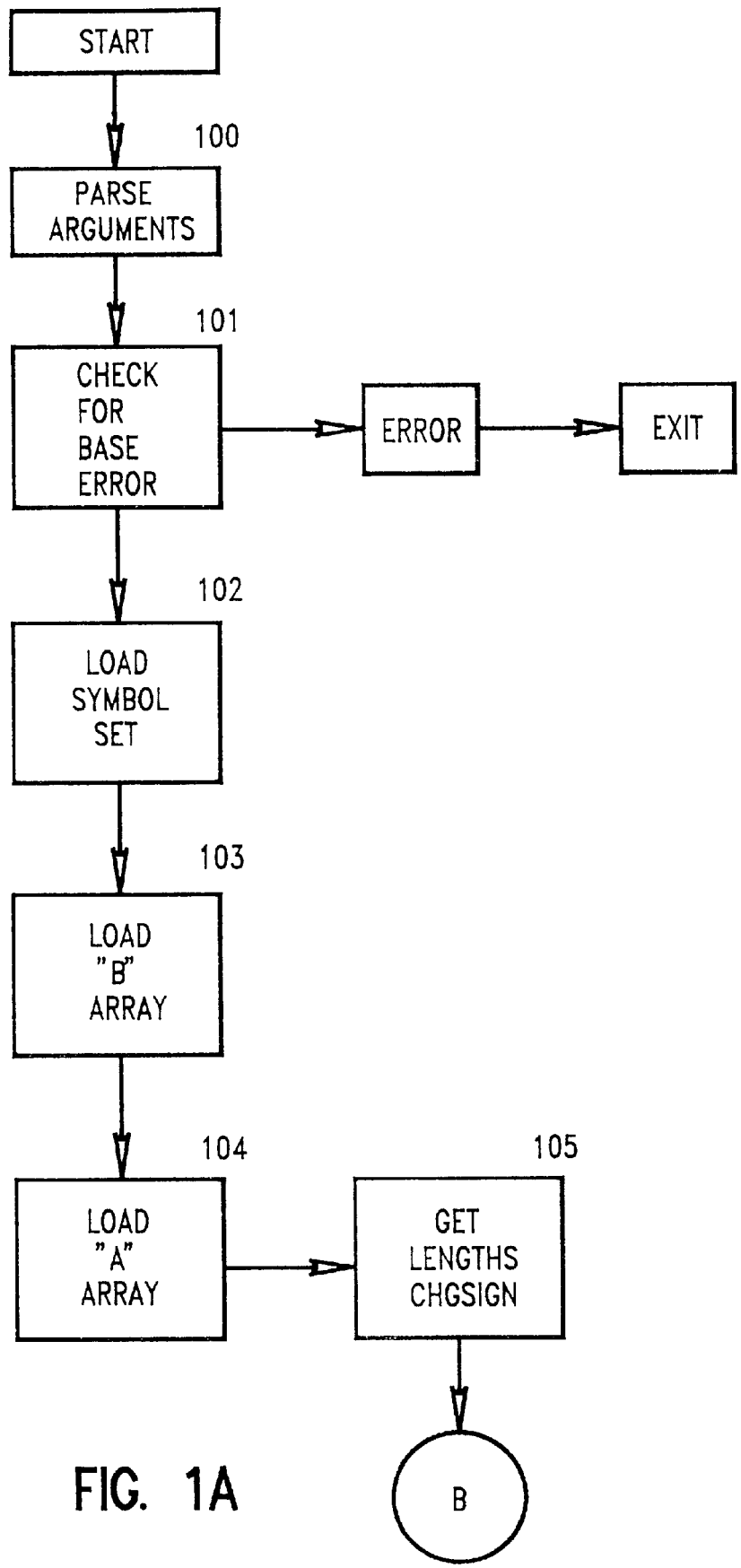
FIGS. 1A–1E are flow diagrams illustrating the steps of the process of the present invention.
Figure 1B:
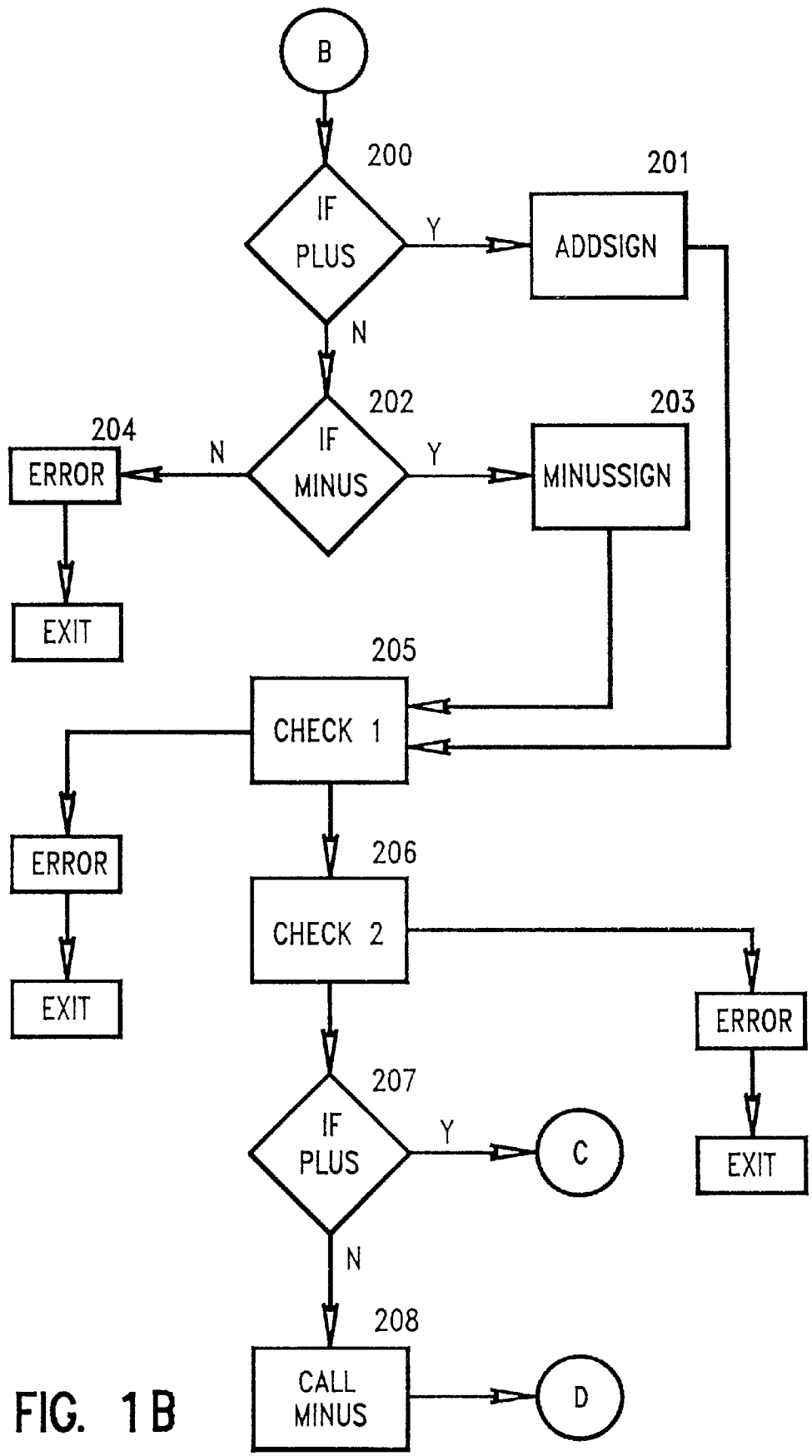
Figure 1C:
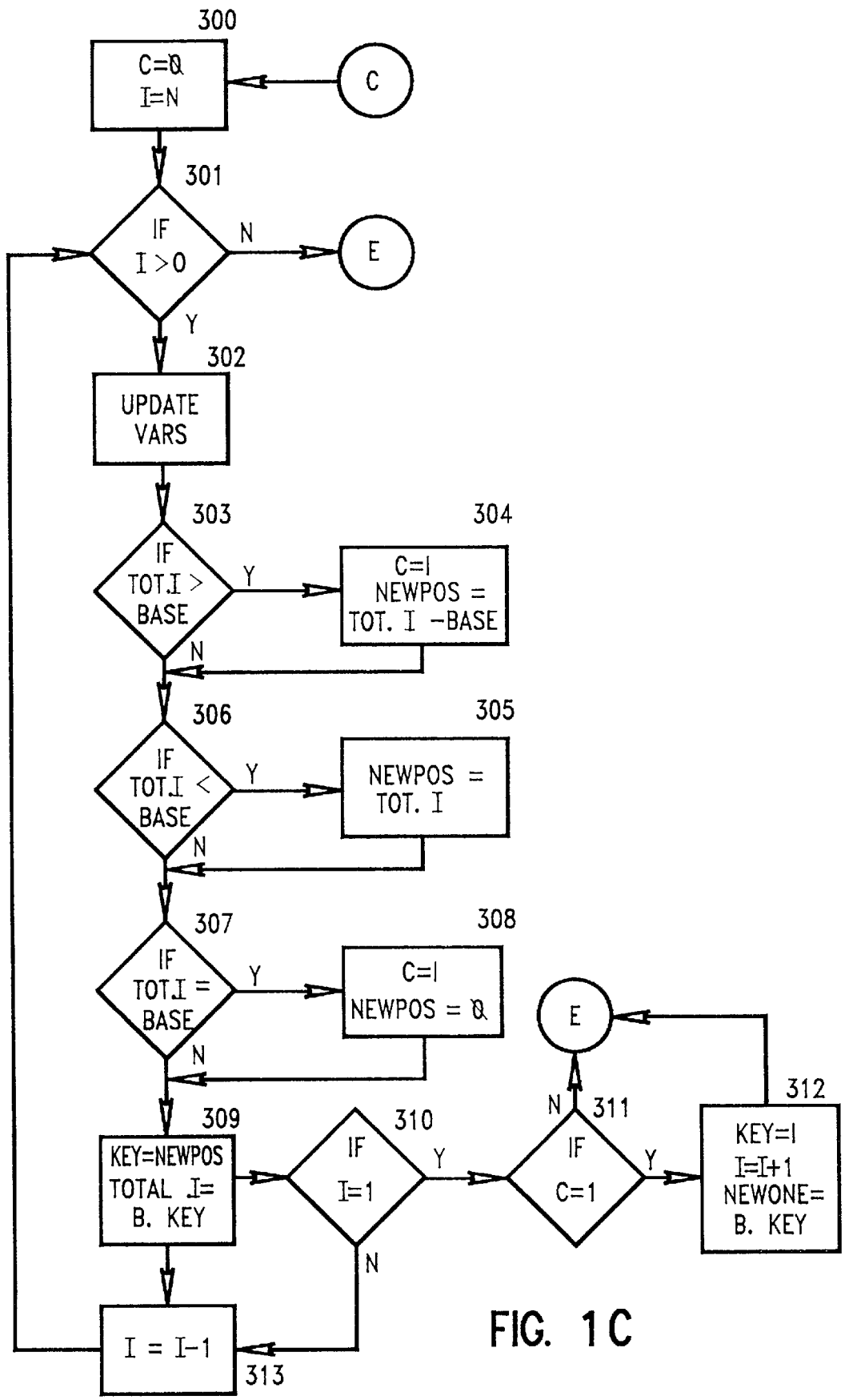
Figure 1D:
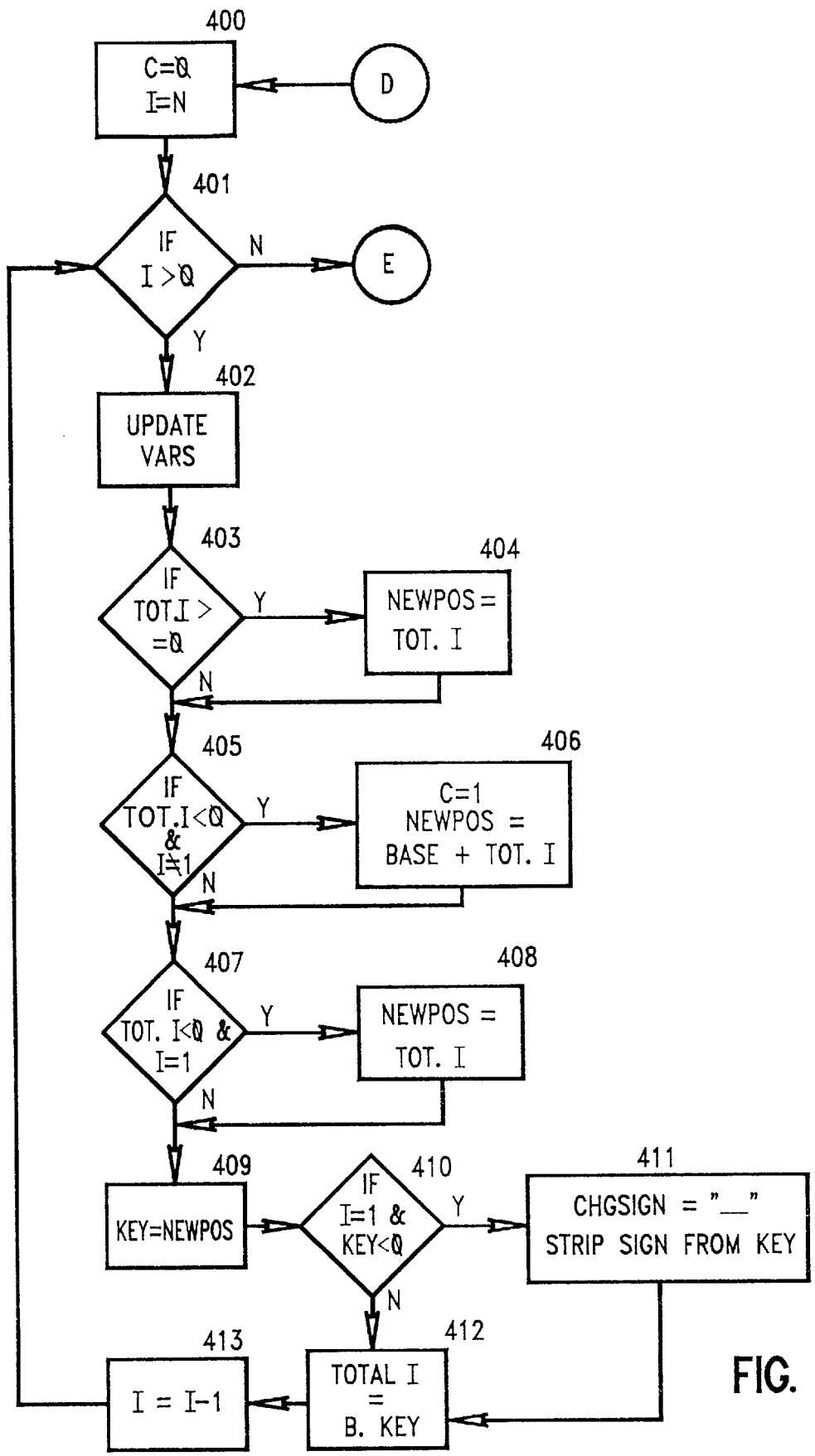
Figure 1E:
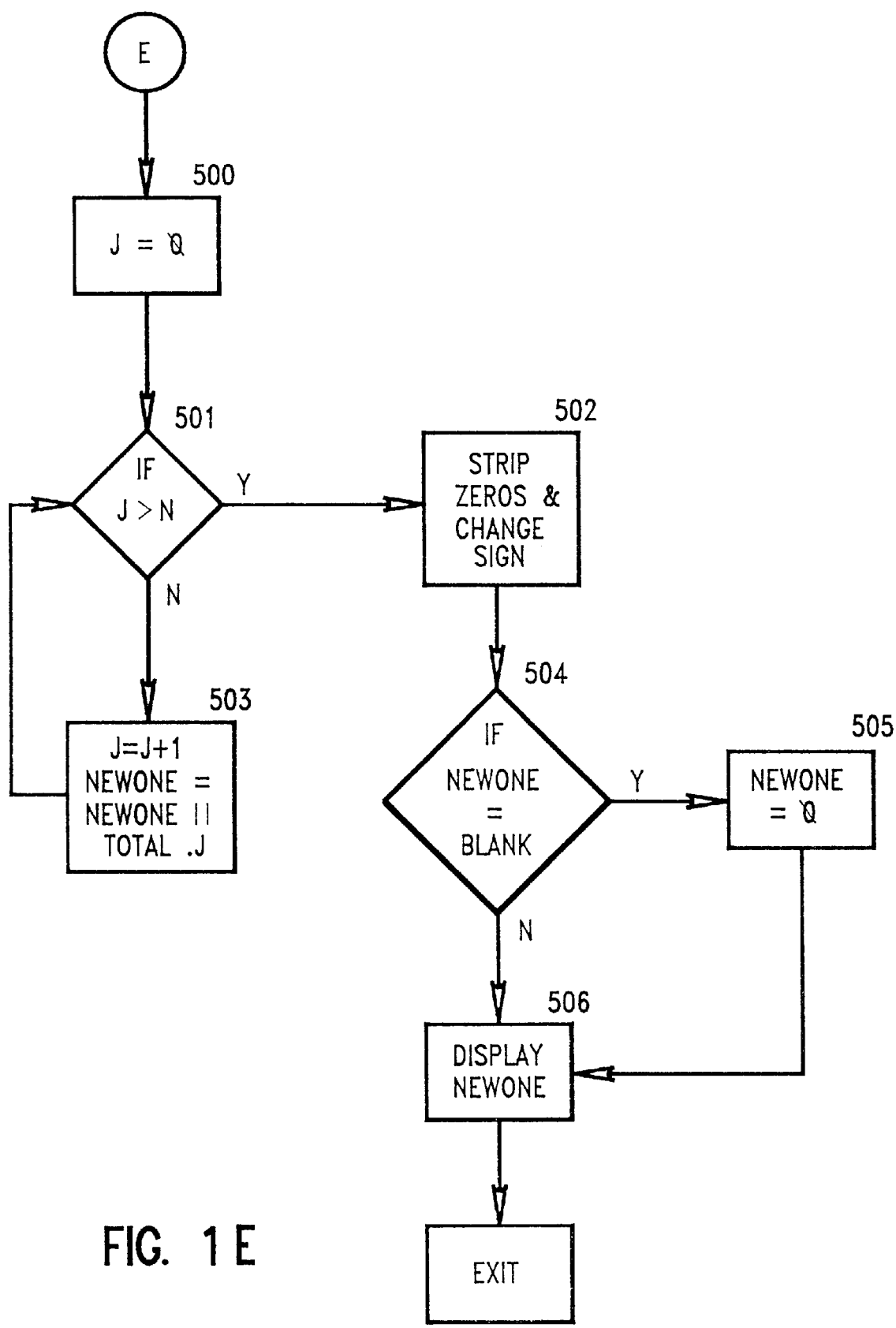

FIGS. 1A and 1E are flow diagrams illustrating the steps of the process of the present invention. Referring to FIG. 1A, the process starts at step 100 wherein the following four (4) arguments are parsed: (i) the number base ("BASE"), (ii) the first number ("NNUM"), (iii) a plus or minus sign ("SIGN"), and (iv) the second number ("NNUM1"). A series of checks are then done on the arguments. One of the checks is implemented in step 101 which verifies that the number base is between 2 and 36, inclusive. If the number base is outside of this range, then an error flag is set and the process is terminated.

Step 102 effects loading a symbol set into a predefined array designated as the "C" array. The symbols can be numbers, letters, signs, etc., and as stated earlier, they can be from any language. Step 103 effects loading a portion of the symbol set into the "B" array. The portion of the "C" array that is read into the "B" array is from the index "0" of the "C" array to index of BASE-1 of the "C" array. Step 104 effects loading the "A" array. This "A" array is loaded from the "B" array. The value of the "Nth" index of the "B" array is loaded as the index to the "Nth" index of the "A" array. The "Nth" index of the "B" array is loaded as the value of the "Nth" index of the "A" array. Thus, the "A" array is loaded with data from the "C" array with the index of the "A" array equal to the value of "C" array elements from "0" to BASE-1.

Step 105 prepares the numbers for addition or subtraction operations. Specifically, step 105 determines the lengths of the incoming numbers that are to be added or subtracted. The length of the first number, NNUM, is designated as "M". The length of the second number, NNUM1, is designated as M1. Step 105 also initially sets a variable designated as "CHGSIGN" equal to " " (a blank).

The process then shifts to step 200. Step 200 determines if "SIGN" is equal to "+" indicating an addition operation. If "SIGN" is a "+", then the process shifts to step 201 which is referred to as the "ADDSIGN" step in FIG. 1B.

In step 201, the second or "shorter number" is left-justified with zeros to make that number equal in length to the number having the greater number of digits (the "longer number"). Step 201 sets the variables N and NUM as the length and value, respectively, of the incoming number having the greatest number of digits. Step 201 also sets the variables N1 and NUM1 as the length and value, respectively, of the remaining incoming number which has fewer digits then the incoming number designated as NUM. If both incoming numbers have the same number of digits, then the length and value of the first incoming number are designated as N and NUM, respectively, the length and value of the second incoming number are designated as N1 and NUM1, respectively, and no additional numbers are added to the second incoming number. After step 201, the process shifts to step 205 which is discussed in detail below.

If in step 200, it is determined that "SIGN" is not equal to "+", then the process shifts to step 202. Step 202 determines whether "SIGN" is equal to "--" thereby indicating a subtraction operation. If step 202 determines that "SIGN" is equal to "--", then the process shifts to step 203 which is discussed below in detail. If in step 202, it is determined that "SIGN" is not equal to "-", the process shifts to step 204 which sets an error flag. The process is then terminated.

In step 203, which is designated as "MINUSSIGN" in FIG. 1B, the variables N and NUM are designated as the length and value, respectively, of the incoming number having the greatest number of digits. Step 203 also sets the variables N1 and NUM1 as the length and value, respectively, of the remaining incoming number which has fewer digits then the number designated as NUM. The second or "shorter number" is left-justified with zeros to make that number equal in length to the number having the greater number of digits (the "longer number"). If both incoming numbers contain the same number of digits, then the number having the highest value is designated as NUM and the lower value number is designated as NUM1. Additional zeroes are not necessary when both numbers have the same number of digits. If the order of the numbers are reversed, i.e. NUM is set to equal the lower value number and NUM1 is set to equal the greater value number, then "CHGSIGN" is set to "--".

After steps 201 and 203, the process shifts to step 205 which is referred to as "CHECK 1" in FIG. 1B. In step 205, the individual digits of the first number, designated as NUM, are loaded into the "D" array. The digits are loaded into the "D" array from left to right. Step 205 then checks or verifies whether the digits are in the defined symbol base by taking the values of each element of the "D" array and using these values as the index of the "A" array. Step 205 then determines whether the value in is each indexed location in the "A" array exists. If the value in the "A" array does not exist, then an error flag is set and the process is terminated.

After step 205, the process shifts to step 206. In step 206, the individual digits of the second number, designated as NUM1, are loaded into the "E" array. The digits are loaded into the "E" array from left to right. Step 205 then checks or verifies whether the digits are in the defined symbol base by taking the values of each element of the "E" array and using these values as the index of the "A" array. Step 206 then determines whether the value in each indexed location in the "A" array exists. If the value in the "A" array does not exist, then an error flag is set and the process is terminated.

Step 207 then determines if "SIGN" is equal to "+". If it is determined that "SIGN" is equal to "+", then the process shifts to the addition routine which starts at step 300 as illustrated in FIG. 1C. If step 207 determines that "SIGN" does not equal "+", then the process shifts to step 208. Step 208 initiates the subtraction routine which starts at step 400 which is illustrated in FIG. 1D.

Step 300 is the first step in the addition routine. The addition routine, shown by steps 300–313 in the flow sheet of FIG. 1C and described in the Example below, effects successive iterations or loops through the "D" and "E" arrays simultaneously from the last index to the first index.

The subtraction routine is illustrated by steps 400–413 shown in the flow sheet of FIG. 1D and described in the Example below. The largest value number is identified and the second number is left-justified with zeros to make the number equal in length to the longer number. If the numbers are identical in length and the second number is the larger value, then the result will later be changed to a minus to indicate a negative result. The longer number is read into the "D" array and the shorter number is read into the "E" array. The subtraction routine effects successive iterations or loops through the "D" and "E" arrays simultaneously from the last index to the first index. The result of the subtraction is obtained by looping through all of the elements of the "TOTAL" array from beginning to end and concatenating the results followed by stripping the leading zeros. The sign of the result may be changed and all leading zeros are stripped except if there is only one zero.

EXAMPLE

---

100 Parse the four arguments the program is expecting. They are the BASE which is the number base, NNUM the first number, SIGN the sign and NNUM1 the second number.
101 Check if BASE is from 2 to 36. If not then issue and error message then exit.
102 Load the symbol set which is the predefined "C" array. Example C.0 = '0';
C.1=1;C.2=2;C.3=3;C.4=4;C.5=5;C.6=6;C.7=7;C.8=8;C.9=9;C.10='A';C.11='B';
C.12='C';C.13='D';C.14='E';C.15='F';C.16='G';C.17='H';C.18='I';C.19='J';
C.20='K';C.21='L';C.22='M';C.23='N';C.24='O';C.25='P';C.26='Q';C.27='R';
C.28='S';C.29='T';C.30='U';C.31='V';C.32='W';C.33='X';C.34='Y';C.35='Z';
102 Load the "B" array from a protion of the "C" array. The portion is from the index "0" of "C" to the index of BASE −1 of "C". An example for BASE 16 would be:
B.0='0';
B.1=1;B.2=2;B.3=3;B.3=4;B.5=5;B.6=6;B.7=7;B.8=8;B.9=9;B.10='A';B.11='B';
B.12='C';B.13='D';B.14='E';B.15='F';
104 Load the "A" array from the "C" array with the index of the "A" array equal to the value of the "C" array elements from "0" to BASE −1. An example for BASE would be:
A.0='0';
A.1=1;A.2=2;A.3=3;A.3=4;A.5=5;A.6=6;A.7=7;A.8=8;A.9=9;A.A='10';A.B='11';
A.C='12';A.D='13';A.E='14';A.F='15'
An example loading the "A" array in pseudo code:
do j = 0 to base
  if j = 0 then leave
  key = c.j
  a.key = j
end
105 Get the lengths of the numbers. M = length of NNUM and M1 = length of NNUM1. Make chgsign = ' '
200 If SIGN = plus
201 Consider the two incoming numbers and make the number with the greatest number of digets the first one. Let N = length and NUM the value. Let N1 = the length of the second number and NUM1 the value. Include sufficient zeros on the left of the second number to make the length equal to the length of the larger number. If the numbers contain the same number of digets then consider the first number to be the first and no additional zeros are necessary for the second number. Pseudo code to accomplish this is as follows:
ADDSIGN:
IF M > M1 |M = M1
  THEN DO
    N = M
    N1 = M1
    NNUM1 = RIGHT(NNUM1,M,'0')
    NUM = NNUM
    NUM1 = NNUM1
  END
IF M < M1
  THEN DO

```
            N = M1
            N1 = M
            NNUM = RIGHT(NNUM,M1,'0')
            NUM = NNUM1
            NUM1 = NNUM
            END
202 If SIGN = minus
203 Consider the two incoming numbers and make the number with the greatest number
    of digets the first one. Let N = length and NUM the value. Let N1 = the length of
    the second number and NUM1 the value. Include sufficient zeros on the left of the
    second number to make the length equal to the length of the larger number. If the
    numbers contain the same number of digets then make the one with the highest value
    the first value and no addtional zeros are necessary for the second number. If the order
    of the numbers is reversed then CHGSIGN = '-'. Pseudo code to accomplish this is
    as follows:
    MINUSSIGN:
    IF M > M1
      THEN DO
        N = M
        N1 = M1
        NNUM1 = RIGHT(NNUM1,M,'0')
        NUM = NNUM
        NUM1 = NNUM1
        END
    IF M < M1
      THEN DO
        N = M1
        N1 = M
        NNUM = RIGHT(NNUM,M1,'0')
        NUM = NNUM1
        NUM1 = NNUM
        CHGSIGN = '-'
        END
    IF M = M1
      THEN DO
        N = M
        N1 = M1
        NUM = NNUM
        NUM1 = NNUM1
        DO 1 = 1 TO M
          KEY1 = SUBSTR(NNUM,1,1)
          KEY2 = SUBSTR(NUM1,1,1)
          IF A.KEY1 > A.KEY2 THEN LEAVE
          IF A.KEY1 < A.KEY2
            THEN DO
              N = M1
              N1 = M
              NNUM = RIGHT(NNUM,M1,'0')
              NUM = NNUM1
              NUM1 = NNUM
              CHGSIGN = '-'
              LEAVE
              END
          END
        END
204 If plus or minus sign is not supplied then indicate with an error and exit.
205 Load the individual digets of the first number into the "D" array. Load the digets from
    left to right. Check if the digets are in the defined symbol base by taking the values of
    each element of the "D" array and make the values the index of the "A" array. Ask if
    the value of the "A" array with each index exists. If not then give an error message and
    exit.
206 Load the individual digets of the second number into the "E" array. Load the digets
    from left to right. Check if the digets are in the defined symbol base by taking the values
    of each element of the "E" array and make the values the index of the "A" array. Ask
    if the value of the "A" array with each index exists. If not then give an error message
    and exit.
207 If sign = plus then call the add routine
208 Call minus routine
300 Set C = 0. Set I = N, where "N" equals the the length of the largest number.
301 If I greater than zero, the goto 302. Else goto 500.
302 Set vars. KEY = value of "D" array at the "I" index. Set "S" equal to value of the "A"
    array at the KEY index. Set a new value for KEY. KEY = value of "E " array at the
    "I" index. Set "A" variable = value of "A" array at the KEY index. Summarize the
    total of S + A + C in the TOT array at the "I" index. Reset the value of "C" to "0".
303 If the value of the TOT array at the "I" index is greater than the BASE, then goto 304.
    If not goto 306.
304 Set "C" equal to "1" and set "NEWPOS" equal to the TOT array at the "I" index minus
    BASE.
306 If the value of the TOT array at the "I" index is less than the BASE, then goto 305. If
    not goto 307.
```

-continued

305 Set "NEWPOS" equal to the TOT array at the "I" index.
307 If the value of the TOT array at the "I" index equals the BASE, then goto 308. If not goto 309.
308 Set "C" equal to "1" and set "NEWPOS" equal "0".
309 Set KEY equal to NEWPOS. Set the TOTAL array at the "I" index equal to the "B" array at the KEY index.
310 If I = "1" then goto 311. If not goto 301.
311 If C = "1" then goto 312. If not goto 500.
312 Set KEY equal "1". Set I equal to I + "1". Set NEWOWN equal to the "B" array at the KEY index.
313 Set "I" equal to "I" minus 1
400 Set C = 0. Set I = N, where "N" equals the the length of the largest number.
401 If I greater than zero, then goto 402. Else goto 500.
402 Set vars. KEY = value of "D" array at the "I" index. Set "S" equal to value of the "A" array at the KEY index. Set a new value for KEY. KEY = value of "E" array at the "I" index. Set "A" variable = value of "A" array at the KEY index. Summarize the total of S · A − C in the TOT array at the "I" index. Reset the value of "C" to "0".
403 If the value of the TOT array at the "I" index is greater than or equal to zero, then goto 404. If not goto 405.
404 Set "NEWPOS" equal to the TOT array at the "I" index.
405 If the value of the TOT array at the "I" index is greater than zero and the index "I" does not equal "1", then goto 406. If not goto 407.
406 Set "NEWPOS" equal to the TOT array at the "I" index plus the BASE. Set "C" = "1".
407 If the value of the TOT array at the "I" index is greater than zero and the index equals "1", then goto 408. If not goto 409.
408 Set "NEWPOS" equal value of the TOT array at the "I" index.
409 Set KEY equal to NEWPOS.
410 If I = "1" and the KEY is greater than zero then goto 411. If not goto 412.
411 Set CHGSIGN equal to "−". Strip the sign from KEY.
412 Set the value of the TOTAL array at index "I" equal to the "B" array at the KEY index.
413 Set "I" equal to "I" minus 1
500 Set J = 0
501 If J > N
501 Strip leading zeros from NEWONE. Concatinate the CHGSIGN in front on NEWONE.
503 J = J + 1; NEWONE = NEWONE‖total.J
504 IF NEWONE = blank
505 NEWONE = 0
506 Display NEWONE which is the result of the addition or subtraction.

The process of the present invention can be implemented in any of a variety of programming languages. Specific process steps may have to be modified when the process is implemented in certain languages. However, some programming languages, such as REXX, require no changes.

The process of the present invention effects addition and/or subtraction of any two numbers having any number of digits and in any base with full precision without conversion to a common base. Regardless of the number of digits of each number, the speed of execution remains almost constant per digit. As shown above, the process of the present invention does not require a conversion to a common base. The process of the present invention provides results with full precision regardless of how many digits are used in the addition or subtraction operations implemented. Furthermore, the process of the present invention does not require: (i) conversion to floating point, (ii) standard mathematical algorithms for converting numbers from one base to another, (iii) the definition of addition or subtraction tables, and (iv) the use of exponentiation.

System Architecture

Figure 2:
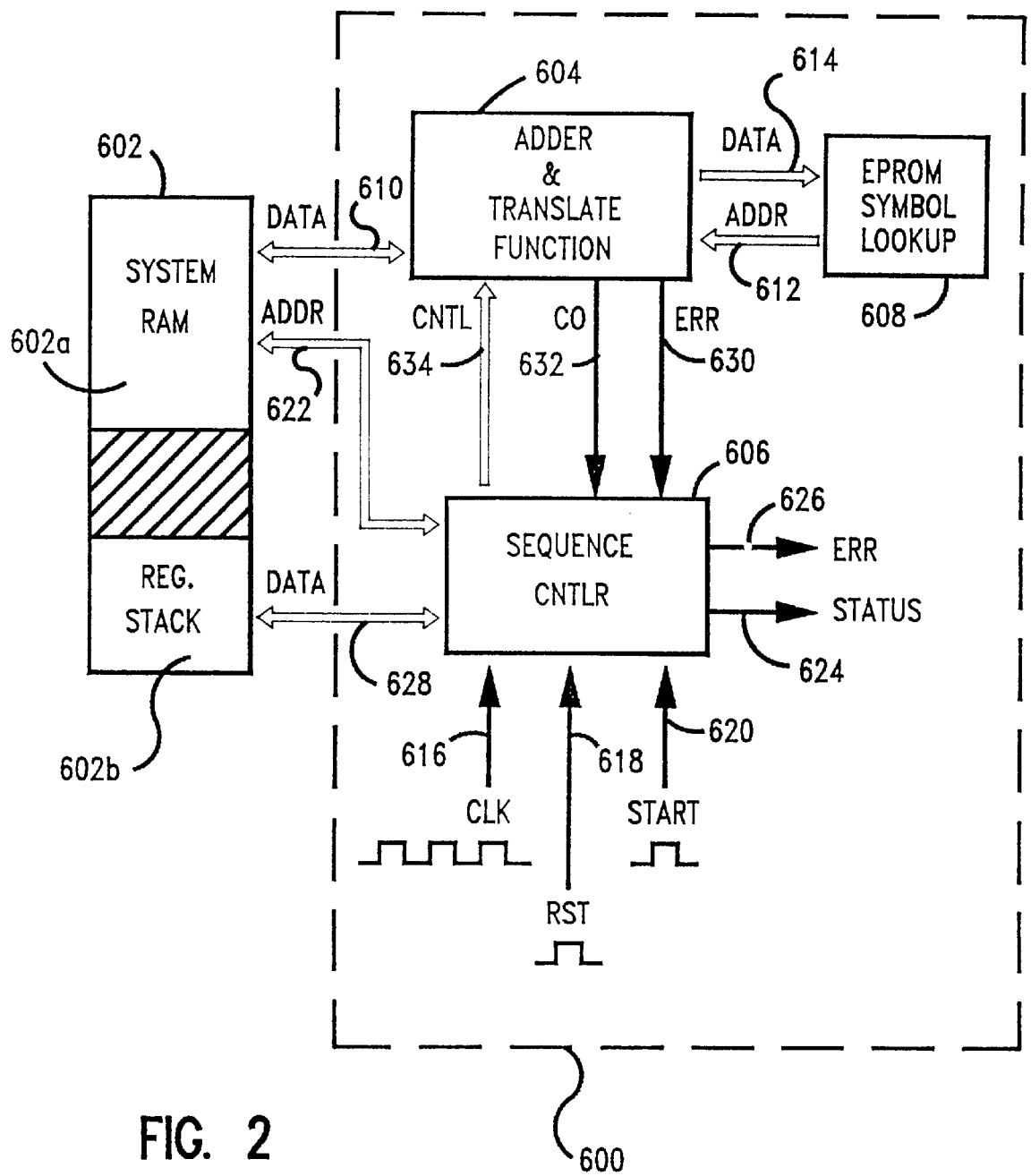
FIG. 2 is a functional block diagram of a system for implementing the process of the present invention.

Referring to FIG. 2, a block diagram of system 600 used to implement the process of the present invention is shown. The basic function of system 600 is to add or subtract two integers of a specified base. The integers can be of any length (i.e., the number of digits is only limited by the amount of system memory). Furthermore, the base system for the two integers is selectable within the range of the specific design configuration (e.g., between 2 and 127, inclusive).

System 600 performs three (3) functions: (i) to translate the digit symbols from the specified base to binary and vice versa, using a ROM (read only memory) lookup table, (ii) add or subtract digits utilizing binary operations and (iii) process each pair of digits of the input numbers or operands sequentially starting from the least significant digit.

System 600 comprises adder and translate circuit 604, sequence controller 606 and symbol look-up table 608. System 600 interfaces with memory 602. Memory 602 comprises a random access memory (RAM) portion 602a and a register stack portion 602b. Random memory access portion 602a functions as a shared memory. Memory portion 602a and register stack 602b function as a transfer link for interface data and control signals inputted into system 600. Such a configuration is similar to the way a software function would interface with the calling program and pass parameters.

Adder and translate circuit 604 receives the two input operands or numbers from memory 602 over bus 610. Circuit 604 performs the basic arithmetic operation of base translation, addition, and subtraction for each digit of the two input numbers. Circuit 604 can be realized as an arithmetic logic unit (ALU). The translation of each digit symbol from the specified base to binary and back is performed via symbol lookup table 608. Look-up table 608 receives table addresses generated by circuit 604 over address bus 612. The translation is routed back to circuit 604 via data bus 614. Look-up table 608 is preferably an EPROM (erasable programmable read only memory). Circuit 604 outputs error signal "ERR" 630 when invalid input data or hardware error is detected. Circuit 604 also outputs carry "CO" signal 632 which will be discussed below.

Loop sequencing, error checking, and timing control is provided by sequence controller 606. Controller 606 receives system master clock signal "CLK" 616, reset signal "RST" 618, and operation start clock signal "START" 620 from a main hardware system (not shown). Signals 616, 618 and 620 drive and synchronize system 600. Sequence controller receives "CO" signal 632, and processes the carry and borrow conditions for the sequential pair of digits to be added or subtracted. Controller 606 generates addresses of memory locations in memory 602 that contain the input numbers that are to be added or subtracted. The addresses are inputted to memory 602 via data bus 622. Data is exchanged between memory 602 and controller 606 via data bus 628. The parameters and data interface is based on shared access of memory 602. Controller 606 outputs a multi-bit control "CNTL" signal 634 for each successive sequential execution step. Controller 606 outputs "STATUS" signal 624 to indicate the status condition of system 600. Controller 606 also outputs error indication signal "ERR" 626. Error signal "ERR" 626 is outputted in response to receipt of error signal "ERR" 630 from circuit 604 and any errors encountered by the sequence controller 606.

The main hardware system (not shown) loads data, the two (2) integer operands, into shared memory portion 602a, and loads the remaining parameters into register stack portion 602b prior to outputting RST and START signals 618 and 620, respectively, for input into controller 606. Circuit 604 loads the result of the addition or subtraction operations and other parameters onto data bus 610 for input into shared memory portion 602a and register stack portion 602b for use by the main hardware system.

Figure 3:
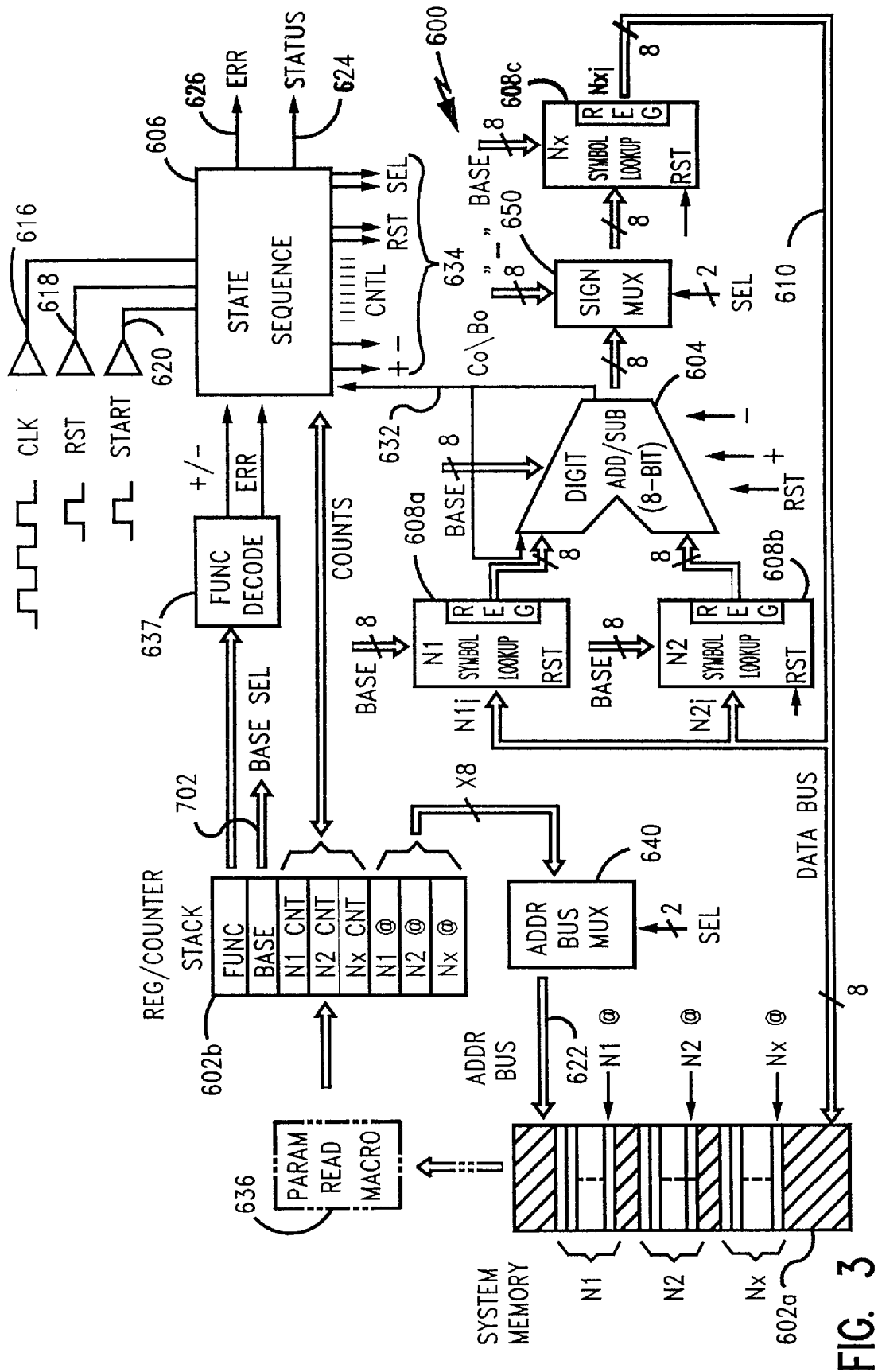
FIG. 3 is a functional block diagram of the bussing, data handling and data control circuitry of the system shown in FIG. 2.

FIG. 3 illustrates the bussing and configuration of data areas and controls of system 600. Shown in shared system memory 602a are three blocks of data (N1, N2, and Nx). N1 and N2 are the two input integers to be added or subtracted, and Nx is the memory location where the result of the addition or subtraction operation will be loaded. N1 and N2 can each consist of any number of digits. The output area for Nx is preferably at least one digit greater than the larger of N1 and N2. In the ensuing description, the system configuration is based on one (1) byte character per digit and a base range between 2 and 128, inclusive.

Register stack 602b stores eight (8) parameters. The first register, designated as "FUNC", is the function to be performed, i.e. addition (+) or subtraction (--). The second register, designated as "BASE", stores the numeric base to be used. The sixth, seventh and eighth registers, designated as N1@, N2@ and Nx@, respectively, contain the memory addresses of the least significant digit for the respective integers. The third, forth and fifth registers designated as N1_CNT, N2_CNT and Nx_CNT, respectively, contain the count or quantity of digits (or length) of the integers.

In an alternate embodiment, the chosen parameters can be loaded into the register stack from memory 602b via macro 636, shown in phantom, rather than using a main hardware system. Such a configuration would convert system 600 into a self contained system.

The function parameter stored in the "FUNC" register is typically a byte (eight (8) bits) and is decoded into one of many, e.g. 1:256, possible functions via function decoder 637. The process of the present invention, as described above, is configured to effect two (2) functions, "+" (addition) and "---" (subtraction). Any other function loaded into register stack 602b would result in the generation of an error signal. However, system 600 may be expanded to implement functions other than addition or subtraction.

System memory address buss multiplexer 640 receives select signal "SEL", which is comprised of two (2) bits of control signal 634, from sequence controller 606, to select integer Nij to be addressed via the address stored in the Ni_@ register wherein i=1,2 or x and denotes the integer and j denotes a specific digit for the respective integer. Such a configuration allows reading a specific digit for N1 or N2 and writing a digit to Nx via data bus 610. As each set of digits is processed, the Ni@ registers are incremented to the address of the next digit system memory 602a. The main system (not shown) has full access and control to system memory 602a via address bus 622 and data bus 610.

The contents of the register designated "BASE" in register stack 602b is converted into a binary representation of the desired numeric base. This is accomplished by the base select system lookup-circuit 700 shown in FIG. 4. Base-translator circuit 700 converts an input base-symbol to an equivalent binary representation. As an example, given an operation in base 16 having a symbol "G", the output of the base translator circuit is '100010000'b. The base parameter 702, which is represented by a symbol in a specific base, is outputted from register stack 602b and inputted into address decode circuit 704 which generates an address of EPROM 706. The contents of EPROM 706 are pre-loaded with the corresponding binary representation of the base symbol being decoded. Any base symbol having 8-bits will be decoded into a unique EPROM address (1:256). EPROM 706 is pre-loaded with '0'b at address locations that correspond to symbols that do not represent a valid or supported base thereby generating an invalid base error. The output 708 of EPROM 706 is the base in binary form and is inputted into symbol look-up circuits 608a–c and digit addition/subtraction circuit 604. Comparator 710 checks to ensure that the binary value of the base is greater than 1. If the value of the base is not greater than one, an error condition is flagged to sequencer 606.

The actual symbol conversion is performed only once after the start of the function invocation. The output base, in binary form, is inputted into N1, N2 and Nx symbol lookup circuits 608a, 608b and 608c, respectively, which are three separate portions of EPROM look-up circuit 608 in FIG. 2. The output binary base is also inputted into digit addition/subtraction circuit 604. N1 and N2 symbol look-up circuits 608a and 608b, respectively, translate an input digit symbol to a binary representation of that symbol for the selected base. The binary representation is latched in an output register prior to being inputted into circuit 604.

The Nx symbol look-up circuit 608c functions in a manner that is the reverse of N1 and N2 symbol look-up circuits 608a and 608b described above. Circuit 608c receives a binary digit and converts the digit into its equivalent representation symbol for the selected numeric base. The equivalent representation symbol is latched into an output register and then written to system memory 602a via data bus 610. The notation N1j, N2j, and Nxj represent the j-th digit symbol for N1, N2, and Nx respectively.

The function of digit addition/subtraction circuit 604 is to perform a binary addition or subtraction on a pair of binary digits in the selected numeric base system. This operation is then repeated for all the digits in N1 and N2 sequentially from the least significant digit to the most significant digit. The function maintains appropriate carry and borrow conditions between the digit operations. This operation is significantly different from a classic binary addition or subtraction.

Sign multiplexer 650, upon receipt of a select signal "SEL" from the state sequencer circuit 606, adds a "−" sign symbol when the result of the subtraction operation is a negative result. Whether a select signal "SEL" is outputted is determined by state sequencer 606 after it interrogates carry/borrow output signal "Co/Bo" 632 outputted by circuit 604.

State sequencer circuit 606 steps through all the necessary hardware states in order to execute the desired function. Circuit 606 uses the N1_CNT from register stack 602b to determine the number of digits to access from system memory 602a. Circuit 606 also flags errors, via error signal "ERR" 626 due to invalid input data or system abort conditions.

Figure 4:
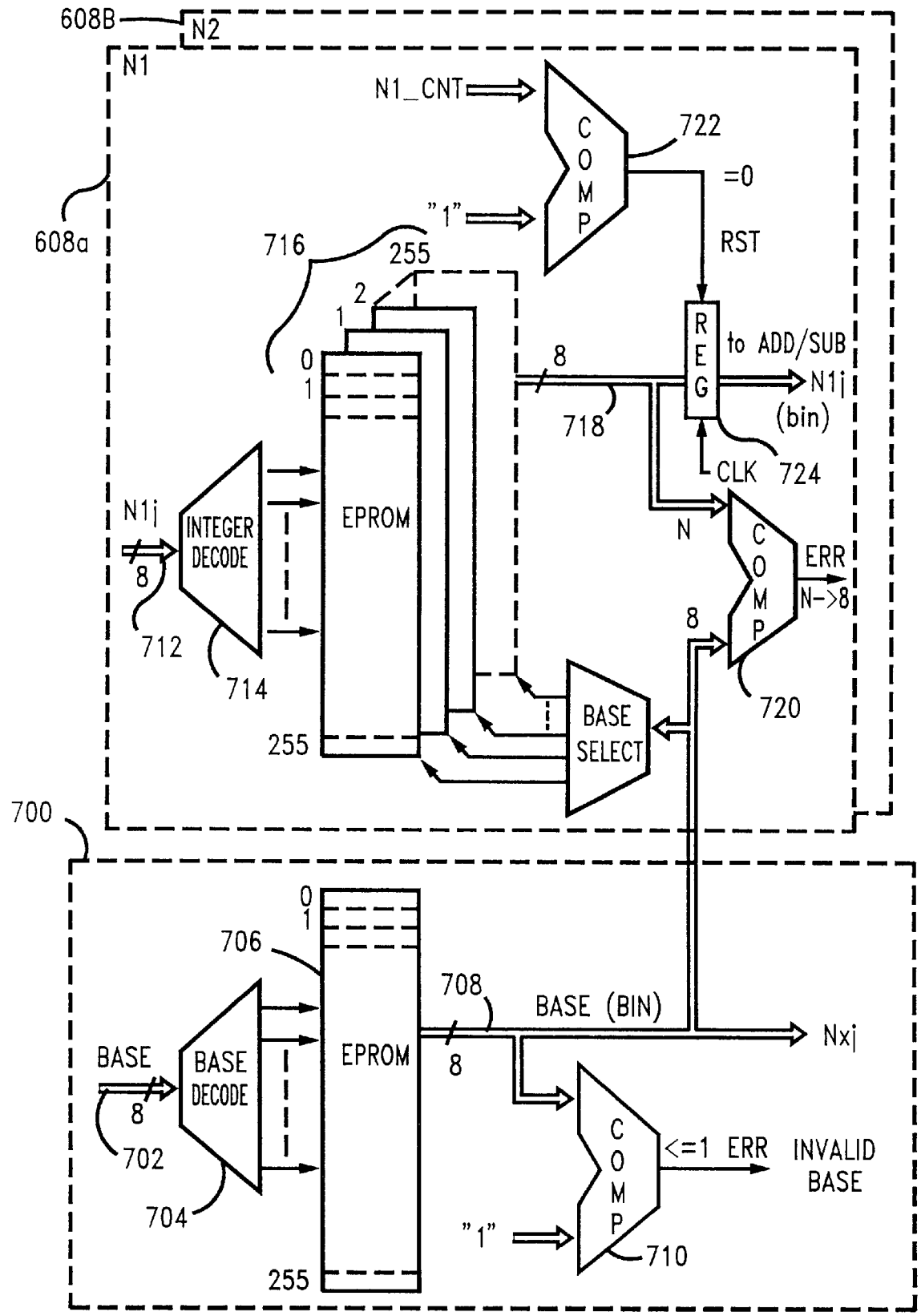
FIG. 4 is a functional block diagram of the base translate circuitry of the system of FIG. 2.

Referring to FIG. 4, the base-symbol, N1 and N2 translate operations are illustrated. The Nx symbol translate function is substantially identical to N1 and but is not shown explicitly in FIG. 4. The Nx symbol translate function will be described in greater detail below. As stated above, primary function of these blocks is to convert the specific integer from a base symbol to binary and vice versa. This is accomplished in hardware using a EPROM lookup table.

Referring again to FIGS. 3 and 4, N1 and N2 symbol look-up circuits 608a and 608b are functionally equivalent to one another. However, to simplify the ensuing discussion, only circuit 608a is discussed. Circuit 608a converts the respective integer symbol (Nij) to its equivalent binary representation. The integer symbol 712 is outputted from system memory 602a and inputted into address decode circuit 714 which generates an address of one of EPROMs 716. The specific EPROM look-up table is selected by the base being used. This allows complete independence from the base-to-base symbol definition. If the base symbols are an ordered subset of the next higher order base, and this holds for all bases used, then the EPROM can be reduced to a single table. Binary output 718 of the selected EPROM is further checked via comparator 720 to insure that its value is less than the binary representation of the base being used. This process is repeated for each digit symbol of the input integer for the Ni_CNT digits. The Ni_CNT comparator 722 insures that the output is set to zero when circuit 608 is clocked beyond the number of digits in the integer. This is required in order to handle integers of unequal lengths by padding zeros in the high order position of the shorter number. The binary output 718 is then latched into an output register 724 and propagated to the addition/subtraction circuit 604.

The Nx symbol look-up circuit 608c performs the same functions as circuits 608a and 608b, but in manner that is the reverse of the way circuits 608a and 608b perform. Circuit 608c receives an binary input from the sign multiplexer circuit 650 which receives its input from addition/subtraction circuit 604. Circuit 608c then translates its input back into the corresponding base symbol. Although the circuit 608c is similar to circuits 608a and 608b, the EPROM in circuit 608c is loaded with different data. Circuit 608c does not require comparators to check for the length of the integer. The length of the integer outputted from circuit 608c is set by incrementing Nx_CNT for every digit processed by sequencer 606.

Figure 5:
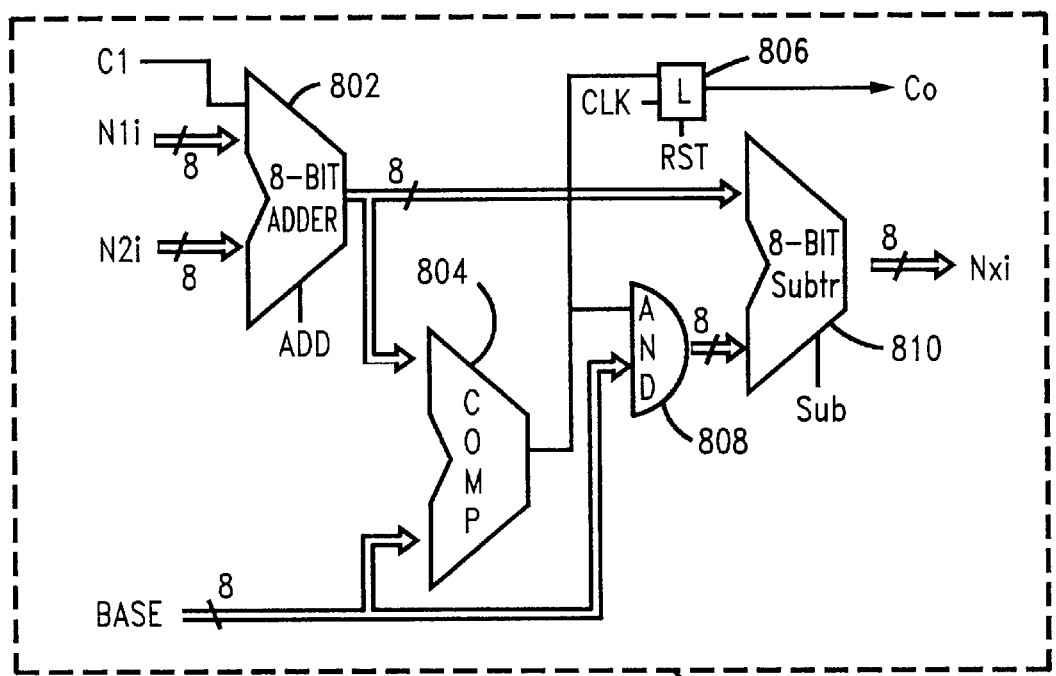
FIG. 5 is a functional block diagram of the digital adder circuit of the system shown in FIG. 2.

The addition of two binary digits in a specified base is a much simpler task once the two digits and the base are represented in true binary form. Adding two (2) eight (8) bit digits can be accomplished by using a plurality of standard logic macros configured to implement the function of digit adder sub-circuit 800, shown in FIG. 5, which is part of digit addition/subtraction circuit 604 (see FIG. 3). Referring to FIG. 5, the interim sum is provided by 8-bit adder circuit bit 802. Circuit 802 can be realized by a standard 8-bit binary add/sub macro with a carry input. For the first pair of digits, the carry input is set to zero by sequence controller 606. The interim sum is then compared to the base, also in binary form, by comparator 804. Comparator 804 can be realized by an 8-bit comparator macro. If the output of the comparator is set to "1" (i.e., the interim sum 8 base), it sets carry latch (L) 806 for the next operation and enables the base to propagate through AND gate 808. The last operation is to conditionally subtract the base from the interim sum. This step is accomplished by subtraction circuit 810 which can also be realized by an 8-bit binary macro. The carry out is also propagated to sequence controller 606 for last digit generation. Thus, circuit 800 implements a process of adding two digits which comprises the following steps:

a) Add the digits to form an interim sum;
b) Compare the interim sum to the base;
c) If the interim sum 0 base, then:
   Subtract the base from the interim sum;
   Set carry for the next pair of digit addition;
d) If the interim sum<base, then:
   Subtract zero from interim sum;
   Set no carry to next pair of digit addition;
e) Repeat above procedure for all pairs of digits.

Figure 6:
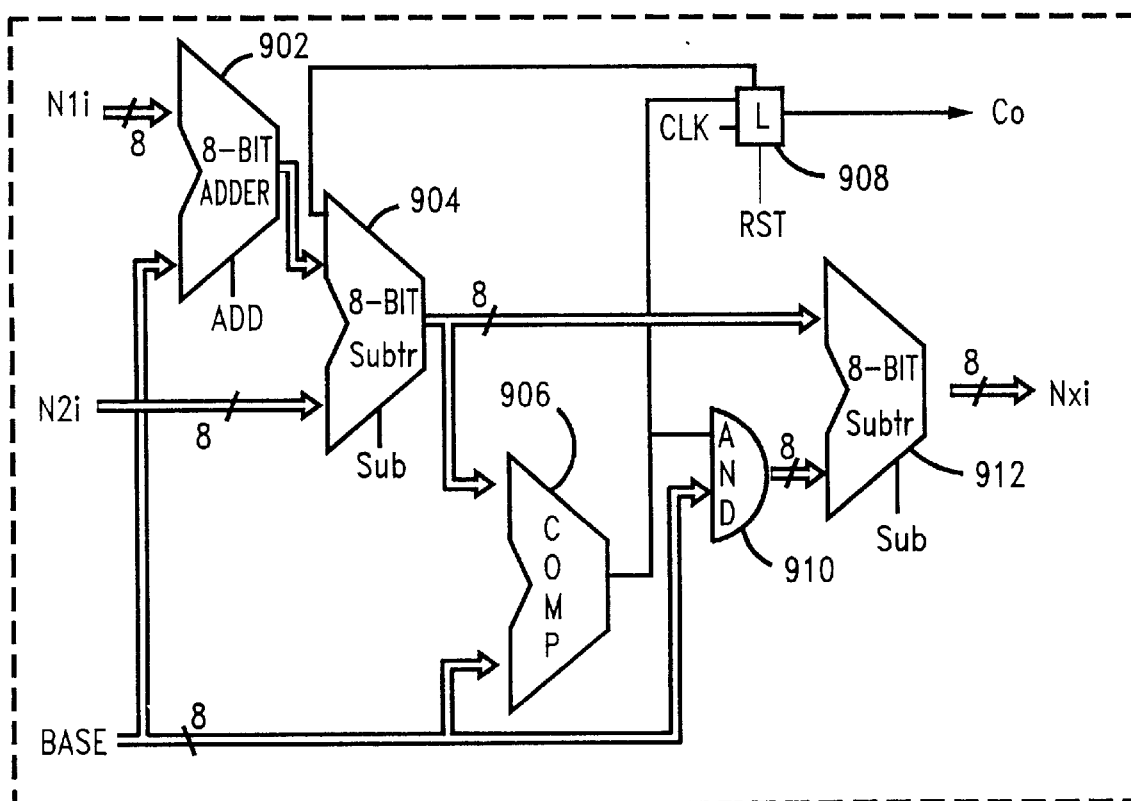
FIG. 6 is a functional block diagram of the digital subtract circuit of the system of FIG. 2.

Referring to FIG. 6, digit subtraction sub-circuit 900 is shown. Circuit 900 is part of circuit 604 shown in FIG. 3. Sequencer 606 processes all the digits in the two numbers twice if N1 is less than N2. Adder circuit 902 adds the BASE to N1i (the first digit of integer N1) to produce an interim sum. N2i (the first digit of N2 ), N2i and the borrow-in are subtracted from the interim sum, via subtraction circuit 904, to produce an interim difference. For the first pair of digits, the borrow-in is set to zero by sequence controller 606. The interim difference is then compared to the BASE by comparator 906. If the output of the comparator is set to "1" (i.e., the interim difference 0 base), it resets borrow latch (L) 906 for the next operation and enables the BASE to propagate through AND gate 908. The last operation is to conditionally subtract the BASE from the interim difference via subtraction circuit 910. The borrow-out is also propagated to sequence controller 606 to determine if a second pass is required and for subtraction sign ("---") generation. Thus, sub-circuit 900 implements a process for subtracting two digits which comprises the following steps:

a) Add the BASE to the N1i digit to form interim sum;
b) Subtract N2i and borrow-in from interim sum to form interim difference;
c) Compare the interim difference to the BASE;
d) If the interim difference 0 base then:
   Subtract the base from the interim difference;
   Set no borrow for the next pair of digit subtraction;
e) If the interim difference<base then:
   Subtract zero from interim difference;
   Set borrow to next pair of digit subtraction;
f) Repeat above procedure for all pairs of digits.

If at the completion of the above sequence, the borrow condition for the most significant pair of digits is set, sequencer 606 determines that N1>N2 and the second pass is initiated. The second pass consists of restoring the address pointers Ni_@, the digit counters (Ni_CNT), and swapping N1 and N2. Swapping of N1 and N2 is accomplished by simply swapping the corresponding memory address registers N1_@ and N2_@, respectively. Once the restoration and swapping operations are completed, the digit subtract process described above is repeated again.

Figure 7:
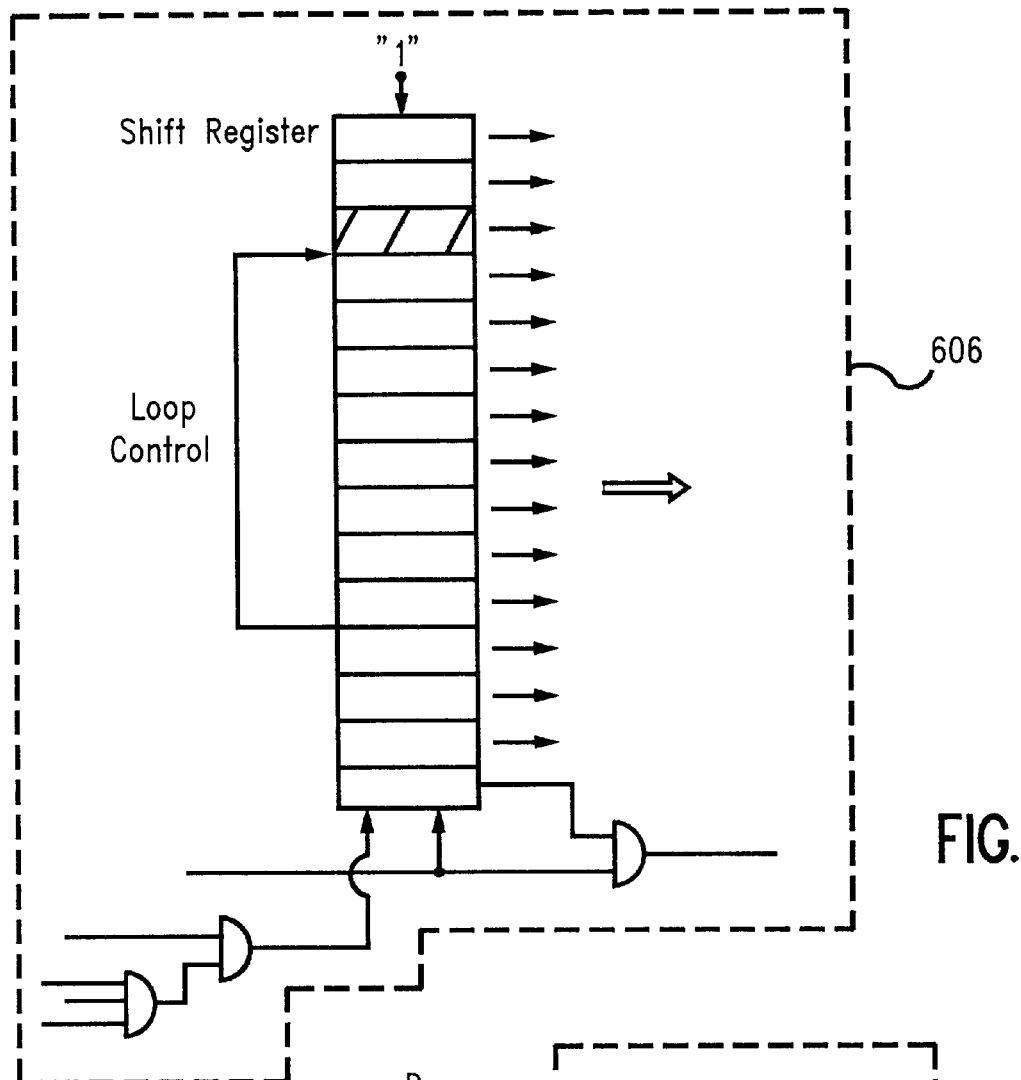
FIG. 7 is a block diagram of the sequence controller circuit of the system of FIG. 2.

Referring to FIG. 7, sequence controller 606 is a simple state machine implemented using a basic shift register. Sequencer controller 606 is started by enabling the system clock to the shift register and maintaining the clock enabled whiled any shift register latches are on. Only the first clock pulse and the START signal effect loading the shift register with a logic "1". The logic "1" propagates through the entire shift register string turning on one latch at a time. The last latch generates the reset signal and enables the completion status condition (the addition or subtraction process is finished) or an error condition as described above.

The looping of sequencer 606 on a subset of states can be achieved by redirecting the bit in the branching latch to the desired state in the shift register until the desired number of loops have been performed. This looping capability is required when the addition or subtraction operations are implemented repeatedly, once for each pair of digits. The basic functions executed by sequence controller 606 are:

a) Reset the system 600;

b) Set busy condition for system 600;

c) Load parameters from memory 602 if required;

d) Save parameters received from register stack 602b;

e) Select and read base symbol;

f) Select and read N1i symbol;

g) Select and read N2i symbol;

h) Decode and perform + or − operation;

i) Select and write Nxi symbol;

j) Maintain (increment & decrement) counters and address registers;

k) Determine and setup looping conditions;

l) Determine multiple subtraction pass conditions (for N1<N2)

m) Set most significant digit ("1" or "−−")

n) Issue error conditions; and o) Terminate processing.

Figure 8:
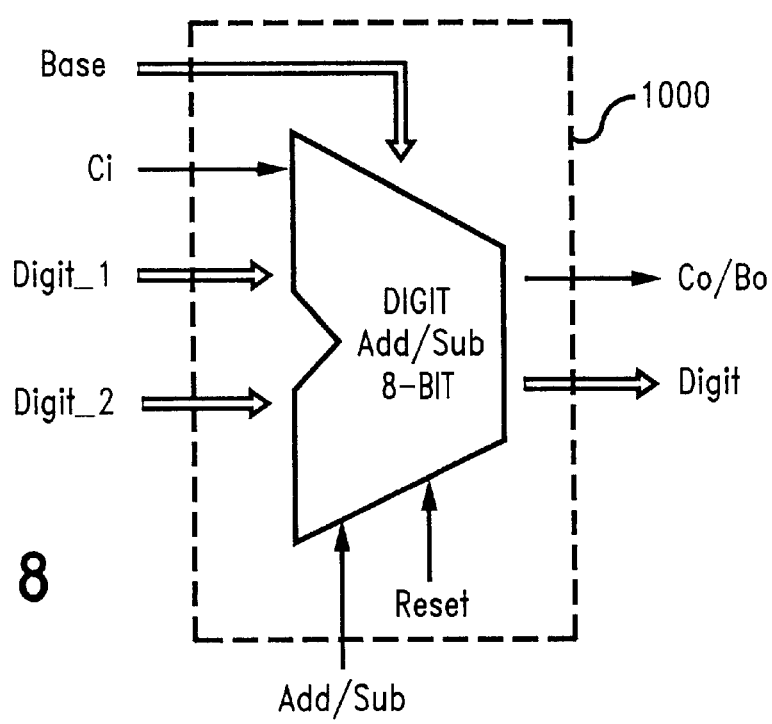
FIG. 8 is a functional block diagram of a preferred embodiment of a digital adder and subtract sub-system which can be used in the system of FIG. 2.

FIG. 8, shows an alternate digit adder/subtraction circuit 1000. Circuit 1000 is a variable base digit addition/subtract circuit. Circuit 1000 performs binary addition or subtraction operations on a pair of binary coded digits in the selected numeric base system. Circuit 1000 is enabled repeatedly in order to perform addition or subtraction operations, in a sequential manner, on all digits in a pair of numbers starting from the least significant digit to the most significant digit. Circuit 1000 maintains appropriate carry and borrow status conditions between operations on each pair of digits and assumes that the input data is valid. Circuit 1000 performs the addition and subtraction operations in a manner significantly different from a classic binary addition or subtraction.

Referring to FIG. 8, all data busses are eight (8) bits wide. The Digit_1 and Digit_2 busses, in conjunction with the carry/borrow-in (Ci), are the binary coded digits to be added or subtracted. The selected numeric base, in which the operation is to be performed, is inputted into circuit 1000 via the data buss designated as BASE. Circuit 1000 outputs the result of the addition or subtraction operation on the Digit_Out bus, and also outputs carry/borrow output Co status. Circuit 1000 also receives "Rst" and Add/Sub" signals which initialize and selecting the functional mode. The system clocking distribution is not shown.

Figure 9:
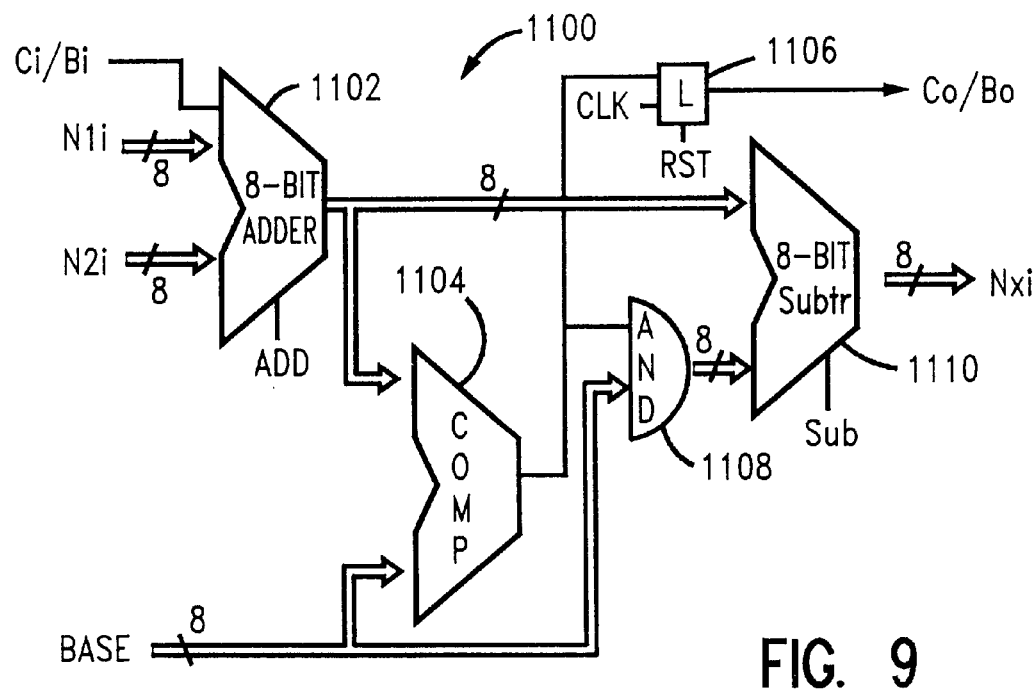
FIG. 9 is a block diagram of the digital adder circuit of the sub-system of FIG. 8.

FIG. 9 shows digit adder sub-circuit 1100 of digit addition/subtraction circuit 1000. The addition of two binary digits in a specified base is a much simpler take once the two digits and the base are represented in true binary form. Adding two (2) eight (8) bit digits can be accomplished by using a plurality of standard logic macros configured to implement the function of circuit 1100. Referring to FIG. 9, the interim sum of N1i and N2i (the input integers to be added) is provided by 8-bit adder circuit 1102. The interim sum is then compared to the base, also in binary form, by 8-bit binary comparator 1104. If the interim sum ∅ the base, then the output of comparator 1104 is set to logic "1" thus setting carry latch (L) 1106 for the next operation and enabling the base to propagate through AND gate 1108. Subtraction circuit 1110 implements the last step of the addition operation which is to conditionally subtract the base from the interim sum. Thus, sub-circuit 1100 implements a process of adding two (2) digits which comprises the following steps:

a) Add the digits to form an interim sum;

b) Compare the interim sum to the base;

c) If the interim sum ∅ base then:
Subtract the base from the interim sum;
Set carry for the next pair of digit addition;

d) If the interim sum<base then:
Subtract zero from interim sum;
Set no carry to next pair of digit addition;

e) Repeat above procedure for all pairs of digits.

Figure 10:
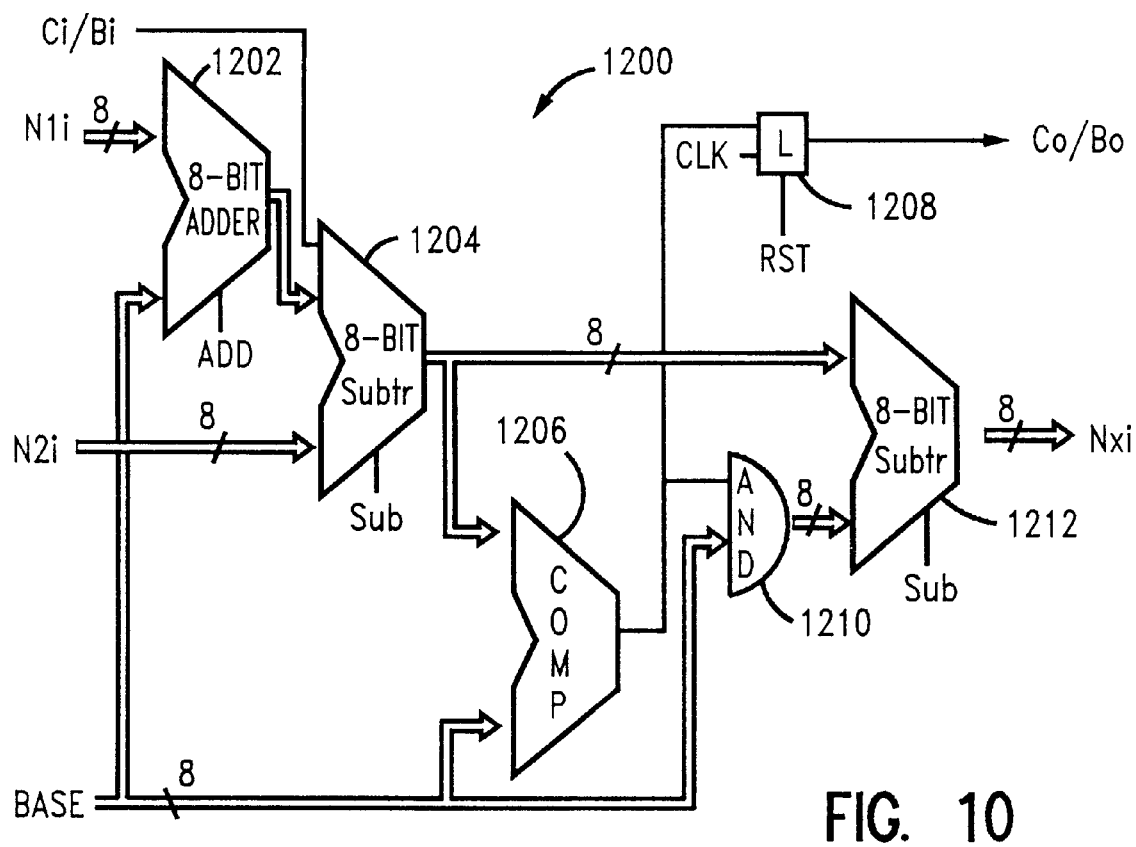
FIG. 10 is a block diagram of the digital subtract circuit of the sub-system of FIG. 8.

Referring to FIG. 10, digit subtraction circuit 1200 is shown. Circuit 1200 realizes the subtraction operation of digit addition/subtraction circuit 1000. Adder circuit 1202 adds the base "BASE" to N1i (the first digit of integer N1) to produce an interim sum. Subtraction circuit 1204 subtracts N2i (the first digit of integer N2) and the borrow-in"BI" from the interim sum to form an interim difference. For the first pair of digits, the borrow-in "BI" is set to zero by the sequence controller 606. The interim difference is then compared to the base "BASE" by comparator 1206. If the interim difference ∅ the base, then comparator 1206 outputs a logic "1" thus resetting borrow latch (L) 1208 for the next operation and enabling the base to propagate through AND gate 1210. Subtraction circuit 1212 implements the last operation which is to conditionally subtract the base from the interim difference. The borrow-out "BO" is also propagated to the sequence controller 606 to determine if a second pass is required and for "−−" sign generation. Thus, circuit 1200 implements a process for subtracting two digits which comprises the following steps:

a) Add the BASE to N1i (the first digit of the first integer) to form an interim sum;

b) Subtract N2i (the first digit of the second integer) and borrow from the interim sum to form an interim difference;

c) Compare the interim difference to the BASE;

d) If the interim difference ∅ the base then:
Subtract the base from the interim difference to produce a final difference;
Set no borrow for the next pair of digit subtraction;

e) If the interim difference<the base then:
Subtract zero from interim difference;
Set borrow to next pair of digit subtraction;

f) Repeat above procedure for all pairs of digits.

Figure 11:
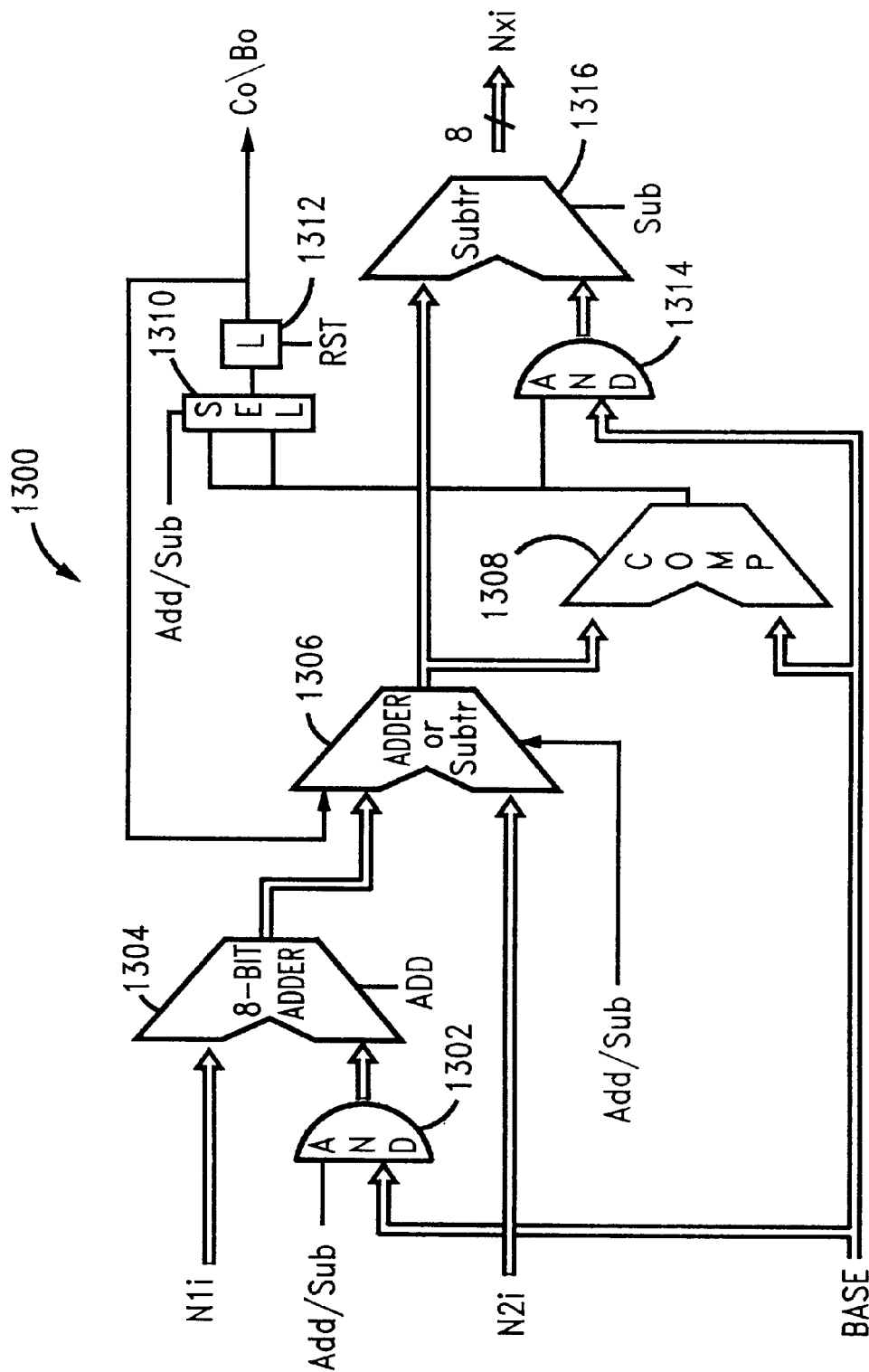
FIG. 11 is a block diagram of a circuit comprising the combination of the digital add circuit of FIG. 9 and the digital subtract circuit shown in FIG. 10.

Referring to FIG. 11, circuit 1300 comprises a combination of the digit add and subtract logic circuits 1100 and 1200, respectively. Circuit 1300 incorporates an "Add/Sub" (addition/subtraction) control line. When an addition operation is to be performed, Add/Sub control line, which is inputted into AND gate 1302, is at a logic "0". When a subtraction operation is to be performed, Add/Sub control line is at a logic "1" level. Thus, when Add/Sub is at a logic "0" level, the output of AND gate 1302 is a logic "0", and when Add/Sub is at a logic "1" level, the output of AND gate 1302 is the "BASE", the base data on the data bus. Add/subtract circuit 1306 is also controlled by the Add/Sub control line.

When the Add/Sub control line is at a logic "1", circuit 1304 adds the base to the ith digit of the first integer N1 to form a first interim sum. Circuit 1306 then subtracts the ith digit of the second integer from the first interim sum to provide an interim difference. The interim difference is then compared to the base "BASE" by comparator 1308. If the interim difference is 0̸ the base, then comparator 1308 outputs a logic "1" thus resetting select register 1310 which resets borrow latch "L" 1312. The logic "1" output from register 1310 also enables AND gate 1314 to propagate the base to subtraction circuit 1316. Circuit 1316 then subtracts the base from the interim difference. If the interim difference less than the base, then comparator 1308 outputs a logic "0" thus setting select register 1310. When select register 1310 is set, it outputs a signal which sets borrow/carry latch "L" 1312 for the next pair of digits to be subtracted. When latch 1312 is set, the borrow/carry signal "Co/Bo" is propagated to the sequence controller to determine if a second pass is required and for "--" sign generation. The logic "0" output from comparator 1308 is also inputted into AND gate 1314 thus preventing the base from propagating to subtraction circuit 1316. Thus, when the interim difference is less than the base, circuit 1316 subtracts zero from the interim difference.

When the Add/Sub control line is at a logic "0", circuit 1304 adds zero to the ith digit of the first integer. Circuit 1306 then adds the ith digit of the first and second integers to provide a final sum. The final sum is then compared to the base "BASE" by comparator 1308. If the final sum is 0̸ the base, then comparator 1308 outputs a logic "1" so as to set select register 1310 which sets borrow latch "L" 1312 thereby setting a carry signal Co for the next pair of digit addition. The logic "1" output from comparator 1308 is also inputted into AND gate 1314 which propagates the base to subtraction circuit 1316. Circuit 1316 then subtracts the base from the final sum. If the final sum is less than the base, then comparator 1308 outputs a logic "0" thus resetting select register 1310. Thus, borrow/carry latch "L" 1312 is prevented from setting a carry to the next pair of digits to be added. The logic "0" output from comparator 1308 is also inputted into AND gate 1314 and prevents the base from propagating to subtraction circuit 1316. Thus, when the final sum is less than the base, circuit 1316 subtracts zero from the final sum.

Thus, circuit 1300 implements a process for adding or subtracting two digits which comprises the following steps:

a) Determine if an addition or subtraction operation is to be performed. If addition, set "Add/Sub" to "0". Else, if subtraction, set "Add/Sub" to "1";

b) If an addition operation is to be performed, then:
Add a zero to the digit of the first integer N1;

c) Else, if a subtraction operation is to be performed, then:
Add the base to the digit of the first integer N1 to form a first interim sum;

d) If an addition operation is to be performed, then:
Add the digit of the first integer N1 to the digit of the second integer N2 to form a second interim sum;

e) Else, if a subtraction operation is to be performed, then:
Subtract the digit of the second integer from the first interim sum to form an interim difference;

f) If the operation is addition and the second interim sum is 0̸ than the base, then:

Subtract the base from the second interim sum;
Set the carry Co for the addition of the next pair of digits;

g) Else, if the second interim sum is less than the base, then:
Subtract zero from the second interim sum;
Set no carry Co for addition of next pair of digits;

h) If the operation is subtraction and the interim difference is 0̸ than the base, then:
Subtract the base from the interim difference;
Set no borrow Bo to the next pair of digits to be subtracted;

i) Else, if the interim difference is less than the base, then:
Subtract zero from the interim difference;
Set borrow Bo to the next pair of digits to be subtracted; and j) Repeat above steps for all pairs of digits.

Although the system of the present invention is configured to add and subtract a paired string of digits, modifications can be made to the system to implement additional and more complex operations. Furthermore, the specific subsystems described above can be implemented with a variety of integrated circuit technology.

The process and system of this invention allows for the processing of data other than Arabic numerals. As stated earlier, the data can be selected from a group comprising, numbers, alphabets, signs, symbols or any language symbols. This would include any computer language, or any spoken or written language. For example, the data could be two names of individuals that need to be added or subtracted and the resulting data would be a new name. Now, if and when this process is reversed one would get the two original names back. This type of application of this invention would be very useful in encoding or encrypting a message and then subsequently decoding the data. A person intercepting such data will not know how to decode the data because first of all, they will not know that a base has been used and secondly, they will not know that a floating base has been used.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A program storage device readable by a machine, tangibly embodying a program of instructions executable by the machine to perform the method steps for adding or subtracting symbols in any base, said method steps comprising:

a) obtaining data defining at least two numbers in a number system having a base and a desired base, each number having at least one digit;

b) adding the digits of the numbers to produce a first interim sum;

c) determining if the first interim sum is greater than or equal to the desired base;

d) subtracting in the desired base from the first interim sum to produce a difference if in step (c), it is determined that the first interim sum is greater than or equal to the desired base;

e) determining the difference if in step (c), it is determined that the first interim sum is greater than or equal to the desired base, or the first interim sum if in step (c), it is determined that the first interim sum is less than the desired base; and f) producing a carry variable for a next digit addition operation if in step (c), it is determined that the first interim sum is greater than or equal to the desired base.

2. The device of claim 1 wherein the numbers in the number system are selected from a group comprising numerals, words, letters, signs, strings of letters representing encoded data and strings of letters and numbers in combination representing encoded data.

3. The device of claim 1 further comprising the step of subtracting zero from the interim sum when the interim sum is greater than or equal to the desired base.

4. The device of claim 1 further comprising the step of determining the number of digits in each number.

5. The device of claim 4 further comprising the step of left-justifying with zeroes the number having the fewer digits.

6. A program storage device readable by a machine, tangibly embodying a program of instructions executable by the machine to perform the method steps for adding or subtracting symbols in any base, said method steps comprising:

a) obtaining data defining numbers in a number system having a base, each number having at least one digit and a value, the data further defining a desired base;

b) adding the desired base to a digit of one of the numbers to produce a first interim sum;

c) subtracting a digit of the other number from the first interim sum to produce an interim difference;

d) determining if the interim difference is greater than or equal to the desired base;

e) subtracting the desired base from the interim difference to produce a final difference if in step (c), it is determined that the interim difference is greater than or equal to the desired base;

f) determining the final difference if in step (c), it is determined that the interim difference is greater than or equal to the desired base, or the interim difference if in step (c), it is determined that the interim difference is less than the desired base; and g) producing a borrow variable for input for a next digit subtraction operation if in step (c), it is determined that the interim difference is greater than or equal to the desired base.

7. The device of claim 6 wherein the inputting step (a) includes the step of determining the number of digits in each number.

8. The device of claim 6 wherein the inputting step (a) includes the step of determining the value of each number, and in step (b), the desired base is added to the number having the greater value to produce the first interim sum, and in step (c), a digit from the number having the lesser value is subtracted from the first interim sum to produce the interim difference.

9. The device of claim 6 wherein the producing step (f) does not produce a borrow variable if in step (c), it is determined that the interim difference is less than the desired base.

10. The device of claim 6 wherein the numbers in the number system are selected from a group comprising numerals, words, letters, signs, strings of letters representing encoded data and strings of letters and numbers in combination representing encoded data.

11. A program storage device readable by a machine, tangibly embodying a program of instructions executable by the machine to perform the method steps for adding or subtracting symbols in any base said method steps comprising:

a) obtaining data defining at least two numbers in a number system having a base, each number having at least one digit and a value, the data further defining operation information and a desired base, the operation information determining if an addition or subtraction operation is to be performed;

b) adding the desired base to a digit of one of the numbers to form a first interim sum if the operation is subtraction;

c) adding corresponding digits of the numbers to form a second interim sum if the operation is addition;

d) subtracting a digit of the other numbers from the first interim sum to form a first difference if the operation is subtraction;

e) determining if the second interim sum is greater than or equal to the desired base if the operation is addition;

f) subtracting the desired base from the second interim sum to form a second difference if the operation is addition and if in step (e), it is determined that the second interim sum is greater than the desired base;

g) determining if the first difference is greater than or equal to the desired base if the operation is subtraction;

h) subtracting the desired base from the interim difference if the operation is subtraction and in step (g), it is determined that the interim difference is greater than or equal to the desired base; and i) generating a carry/borrow variable for use in steps (c) and (d) for succeeding digit addition or subtraction operations, respectively, the carry/borrow variable having a first state when the operation is addition and step (e) determines that the second interim sum is greater than or equal to the desired base, or if the operation is subtraction and step (g) determines that the interim difference is less than the desired base, the carry/borrow variable having a second state if the operation is addition and step (e) determines that the second interim sum is less than the desired base, or if the operation is subtraction and step (g) determines that the interim difference is greater than or equal to the desired base.

12. The device of step 11 wherein the inputting step (a) includes the step of determining the value of each number, and in step (b), the desired base is added to the number having the greater value to produce the first interim sum, and in step (d), a digit from the number having the lesser value is subtracted from the first interim sum to produce the first difference.

13. The device of claim 12 wherein the inputting step (a) includes the step of the step of determining the number of digits in each number.

14. The device of claim 13 further comprising the step of left-justifying with zeroes the number having the fewer digits.

15. The device of claim 11 further comprising the steps of:

j) subtracting zero from the second interim sum if the operation is addition and step (e) determines the second interim sum is less than the desired base; and k) subtracting zero from the first difference if the operation is subtraction and step (g) determines the first difference is less than the desired base.

16. The device of claim 11 further including the step of repeating steps (a)–(i) for all pairs of digits of the numbers.

17. The device of claim data system of claim 11 further comprising the steps of:
  j) outputting the second difference if the operation is addition and step (e) determines the second interim sum is greater than or equal to the desired base;
  k) outputting the second interim sum if the operation is addition and step (e) determines the second interim sum is less than the desired base;
  l) outputting the final difference if the operation is subtraction and step (g) determines the first difference is greater than or equal to the base; and
  m) outputting the first difference if the operation is subtraction and step (g) determines the first difference is less than the desired base.

18. The device of claim 11 wherein the numbers in the number system are selected from a group comprising numerals, words, letters, signs, strings of letters representing encoded data and strings of letters and numbers in combination representing encoded data.

19. The device of claim 11 wherein generating step (i) does not produce a carry/borrow variable if the operation is addition and step (e) determines the second interim sum is less than the desired base, or if the operation is subtraction and step (g) determines that the first difference is greater than or equal to the desired base.

20. A program storage device readable by a machine, tangibly embodying a program of instructions executable by the machine to perform the method steps for adding or subtracting symbols in any base, said method steps comprising:
  a) obtaining data defining at least two symbols in a symbol system having a base and a desired base, each symbol having at least one character;
  b) adding the characters of the symbols to produce a first interim sum;
  c) determining if the first interim sum is greater than or equal to the desired base;
  d) subtracting in the desired base from the first interim to produce a difference if in step (c), it is determined that the first interim sum is greater than or equal to the desired base;
  e) outputting to the storage medium the difference if in step (c), it is determined that the first interim sum is greater than or equal to the desired base, or the first interim sum if in step (c), it is determined that the first interim sum is less than the desired base; and
  f) producing a carry variable for input for a next character addition operation if in step (c), it is determined that the first interim sum is greater than or equal to the desired base.

21. The device of claim 20 wherein each symbol is selected from a group comprising numerals, words, letters, signs, strings of letters representing encoded data and strings of letters and numbers representing encoded data.

22. A program storage device readable by a machine, tangibly embodying a program of instructions executable by the machine to perform the method steps for adding or subtracting symbols in any base, said method steps comprising:
  a) obtaining data defining symbols in a symbol system having a base, each symbol having at least one character, the data further defining a desired base;
  b) adding the desired base to a character of one of the symbols to produce a first interim sum;
  c) subtracting a character of the other symbol from the first interim sum to produce an interim difference;
  d) determining if the interim difference is greater than or equal to the desired base;
  e) subtracting the desired base from the interim difference to produce a final difference if in step (c), it is determined that the interim difference is greater than or equal to the desired base;
  f) determining the final difference if in step (c), it is determined that the interim difference is greater than or equal to the desired base, or the interim difference if in step (c), it is determined that the interim difference is less than the desired base; and
  g) producing a borrow variable for a next character subtraction operation if in step (c), it is determined that the interim difference is greater than or equal to the desired base.

23. The device of claim 22 wherein each symbol is selected from a group comprising numerals, words, letters, signs, strings of letters representing encoded data and strings of letters and numbers in combination representing encoded data.

24. The device of claim 23 wherein each symbol is a number in a number system and each character is a digit of the number.

25. A program storage device readable by a machine, tangibly embodying a program of instructions executable by the machine to perform the method steps for adding or subtracting symbols in any base, said method steps comprising:
  a) obtaining data defining at least two symbols in a symbol system having a base, each symbol having at least one character, the data further defining operation information and a desired base, the operation information determining if an addition or subtraction operation is to be performed;
  b) adding the desired base to a character of one of the symbols to form a first interim sum if the operation is subtraction;
  c) adding corresponding characters of the symbols to form a second interim sum if the operation is addition;
  d) subtracting a character of the other symbol from the first interim sum to form a first difference if the operation is subtraction;
  e) determining if the second interim sum is greater than or equal to the desired base if the operation is addition;
  f) subtracting the desired base from the second interim sum to form a second difference if the operation is addition and if in step (e), it is determined that the second interim sum is greater than the desired base;
  g) determining if the first difference is greater than or equal to the desired base if the operation is subtraction;
  h) subtracting, the desired base from the interim difference if the operation is subtraction and in step (g), it is determined that the interim difference is greater than or equal to the desired base; and
  i) generating a carry/borrow variable for use in steps (c) and (d) for succeeding character addition or subtraction operations, respectively, the carry/borrow variable having a first state when the operation is addition and step (e) determines that the second interim sum is greater than or equal to the desired base, or if the operation is subtraction and step (g) determines that the interim difference is less than the desired base, the carry/borrow variable having a second state if the operation is addition and step (e) determines that the second interim sum is less than the desired base, or if the operation is subtraction and step (g) determines that the interim difference is greater than or equal to the desired base.

26. The device of claim 25 wherein each symbol is selected from a group comprising numerals, words, letters, signs, strings of letters representing encoded data and strings of letters and numbers in combination representing encoded data.

27. The device of claim 26 wherein each symbol is a number in a number system and each character is a digit of the number.

28. The device of claim 25 further including the step of repeating steps (a)–(i) for all pairs of characters of the symbols.

29. The device of claim 25 further comprising the steps of:

j) outputting the second difference if the operation is addition and step (e) determines the second interim sum is greater than or equal to the desired base;

k) outputting the second interim sum if the operation is addition and step (e) determines the second interim sum is less than the desired base;

l) outputting the final difference if the operation is subtraction and step (g) determines the first difference is greater than or equal to the base; and m) outputting the first difference if the operation is subtraction and step (g) determines the first difference is less than the desired base.

* * * * *

UNITED STATES PATENT AND TRADEMARK OFFICE
CERTIFICATE OF CORRECTION

PATENT NO. : 5,912,831
DATED : June 15, 1999
INVENTOR(S) : Edward E. Kelley et al.

It is certified that error appears in the above-identified patent and that said Letters Patent is hereby corrected as shown below:

<u>In the Example (columns 7 & 8)</u>

In line 10, delete "protion" and substitute therefor -- portion --.

In line 13, delete "B.3=4" and substitute therefor -- B.4=4 --.

In line 18, delete "A.3=4" and substitute therefor -- A.4=4 --.

<u>In the Title</u>

Delete "SUBSTRACTING" and substitute therefor -- SUBTRACTING --.

Signed and Sealed this

Ninth Day of November, 1999

Attest:

Attesting Officer

Q. TODD DICKINSON

Acting Commissioner of Patents and Trademarks